US007664135B2

(12) United States Patent
Oshima et al.

(10) Patent No.: US 7,664,135 B2
(45) Date of Patent: Feb. 16, 2010

(54) CONTROL OF NETWORK PLUG-AND-PLAY COMPLIANT DEVICE

(75) Inventors: Yasuhiro Oshima, Nagano (JP); Tsutomu Motegi, Nagano (JP); Yoichi Ikeda, Kagoshima (JP)

(73) Assignee: Seiko Epson Corporation, Tokyo (JP)

(*) Notice: Subject to any disclaimer, the term of this patent is extended or adjusted under 35 U.S.C. 154(b) by 461 days.

(21) Appl. No.: 11/517,439

(22) Filed: Sep. 6, 2006

(65) Prior Publication Data

US 2007/0053376 A1    Mar. 8, 2007

(30) Foreign Application Priority Data

| Sep. 7, 2005 | (JP) | ............................. 2005-259554 |
| Sep. 7, 2005 | (JP) | ............................. 2005-259561 |
| Sep. 9, 2005 | (JP) | ............................. 2005-261979 |

(51) Int. Cl.
*H04J 3/02* (2006.01)

(52) U.S. Cl. ........................... 370/462; 370/389; 710/8; 710/313

(58) Field of Classification Search ................. 709/208, 709/218, 223; 370/462, 466; 710/11, 300, 710/313
See application file for complete search history.

(56) References Cited

U.S. PATENT DOCUMENTS

| 6,978,339 | B2* | 12/2005 | Isoda ........................... 710/313 |
| 2002/0029256 | A1* | 3/2002 | Zintel et al. ................. 709/218 |
| 2002/0078161 | A1* | 6/2002 | Cheng ......................... 709/208 |
| 2003/0005197 | A1* | 1/2003 | Abramson et al. ........... 710/300 |
| 2003/0101294 | A1* | 5/2003 | Saint-Hilaire et al. ......... 710/11 |
| 2003/0123074 | A1* | 7/2003 | Imai et al. .................... 358/1.9 |
| 2003/0217136 | A1* | 11/2003 | Cho et al. .................... 709/223 |
| 2004/0090984 | A1* | 5/2004 | Saint-Hilaire et al. ....... 370/463 |
| 2006/0056449 | A1* | 3/2006 | Morioka ...................... 370/466 |

FOREIGN PATENT DOCUMENTS

| EP | 1 204 042 | 5/2002 |
| FR | 2 837 045 | 9/2003 |
| FR | 2837045 A1 * | 9/2003 |
| JP | 2001-290724 | 10/2001 |
| JP | 2004-112078 | 4/2004 |

OTHER PUBLICATIONS

European Search Report issued Mar. 6, 2007 in European Application No. 06254584.3 (5 pages).

* cited by examiner

*Primary Examiner*—Ricky Ngo
*Assistant Examiner*—Rasheed Gidado
(74) *Attorney, Agent, or Firm*—Nutter McClennen & Fish LLP; John J. Penny, Jr.

(57) ABSTRACT

A network device includes a network protocol controller and a device controller. The device controller controls a plurality of service devices including a first device, and a second device of different type from the first device. The network protocol controller and the device controller are connected by a packetized logical channel for the first device. The network protocol controller, upon having received a message in the network plug-and-play protocol and destined for the second device, transfers the content of the message body of the received message to the device controller, using the logical channel for the first device.

17 Claims, 23 Drawing Sheets

Fig.5A
USB interface/endpoint configuration
Fig.5B
Logical channel configuration
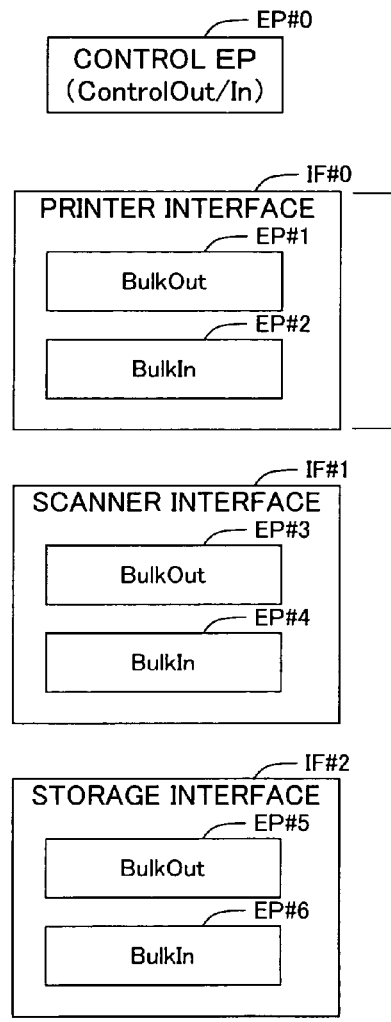
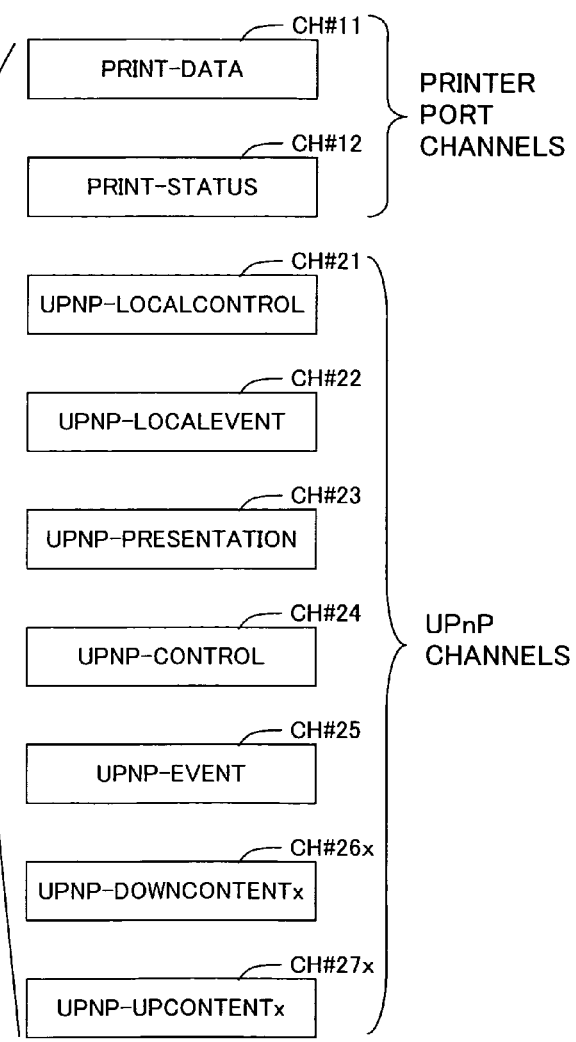

D4 packet configuration (for USB transfer)

UPnP device configuration

Fig.9

Example of device description

```
<?xml version="1.0" ?>
<root xmlns="urn:schemas-upnp-org:device-1-0">
 <specVersion>
  <major>1</major>
  <minor>0</minor>
 </specVersion>
 <URLBase>http://169.254.100.100:80</URLBase>
 <device>
  <deviceType>urn:schemas-upnp-org:device:Printer:1</deviceType>
  ...
  <presentationURL>/PRESENTATION/PRINTER</presentationURL>
  <serviceList>
   <service>
    <serviceType>urn:schemas-upnp-org:service:PrintBasic:1</serviceType>
    <serviceId>urn:upnp-org:serviceId:1</serviceId>
    <SCPDURL>/SCPD/PRINTBASIC1.XML</SCPDURL>
    <controlURL>/CONTROL/PRINTBASIC1</controlURL>
    <eventSubURL>/EVENT/PRINTBASIC1</eventSubURL>
   </service>
   <service>
    <serviceType>urn:schemas-upnp-org:service:PrintEnhanced:1</serviceType>
    <serviceId>urn:upnp-org:serviceId:3</serviceId>
    <SCPDURL>/SCPD/PRINTENHANCED1.XML</SCPDURL>
    <controlURL>/CONTROL/PRINTENHANCED1</controlURL>
    <eventSubURL>/EVENT/PRINTENHANCED1</eventSubURL>
   </service>
  </serviceList>
  <deviceList>
   <device>
    <deviceType>urn:schemas-upnp-org:device:Scanner:1</deviceType>
    ...
   </device>
   <device>
    <deviceType>urn:schemas-upnp-org:device:Storage:1</deviceType>
    ...
   </device>
  </deviceList>
 </device>
</root>
```

Printer device (root device)

Scanner device

Storage device

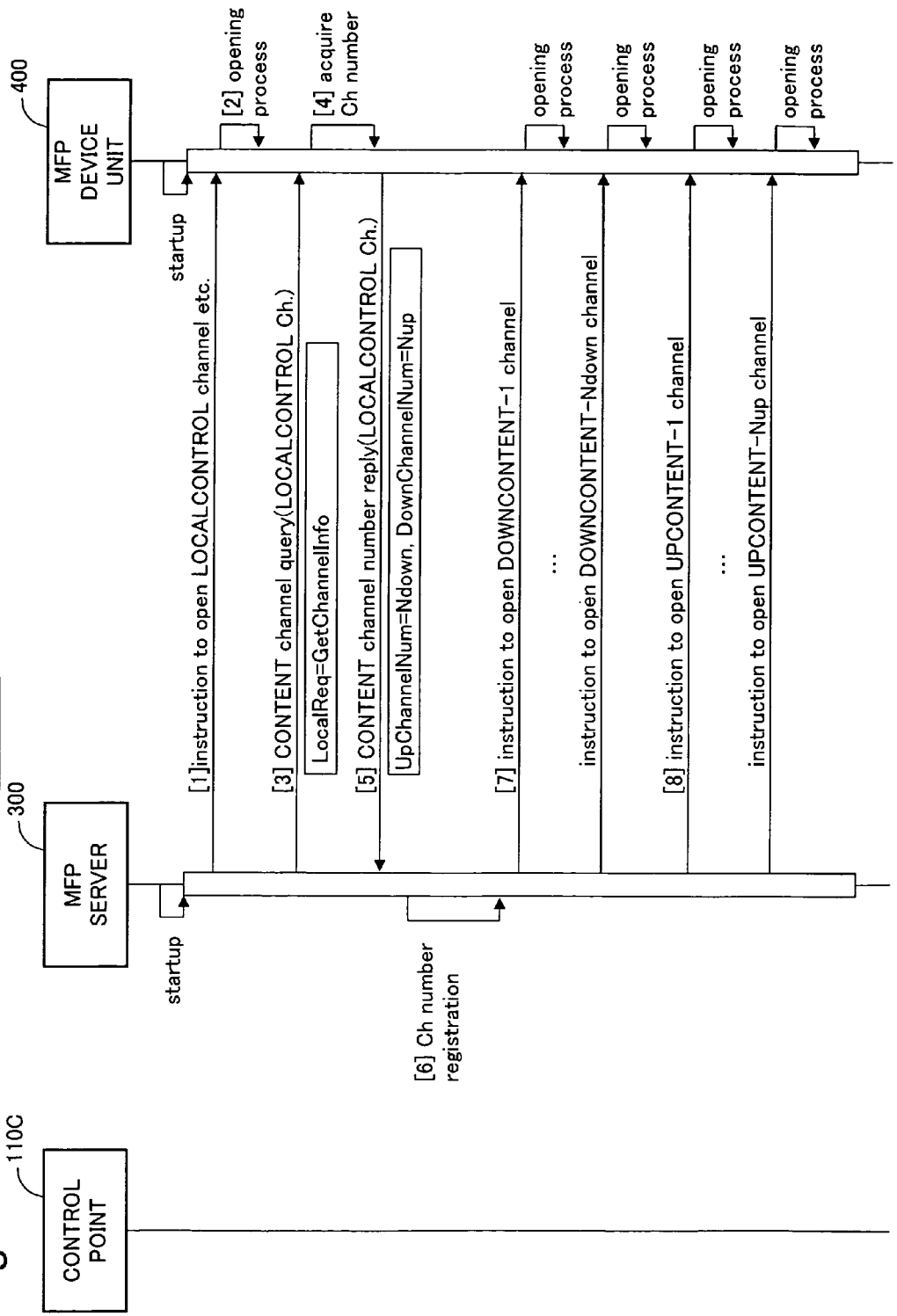

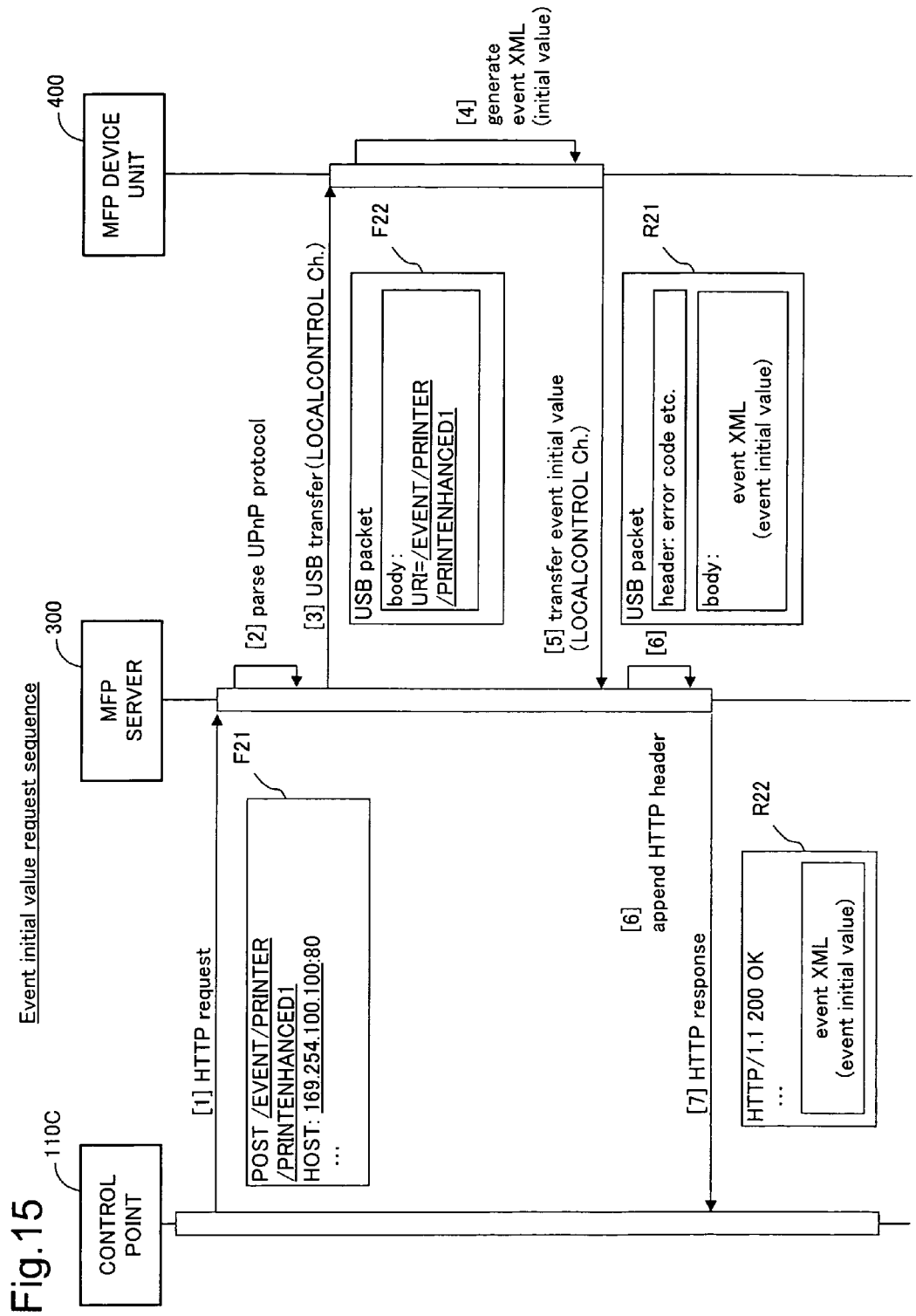

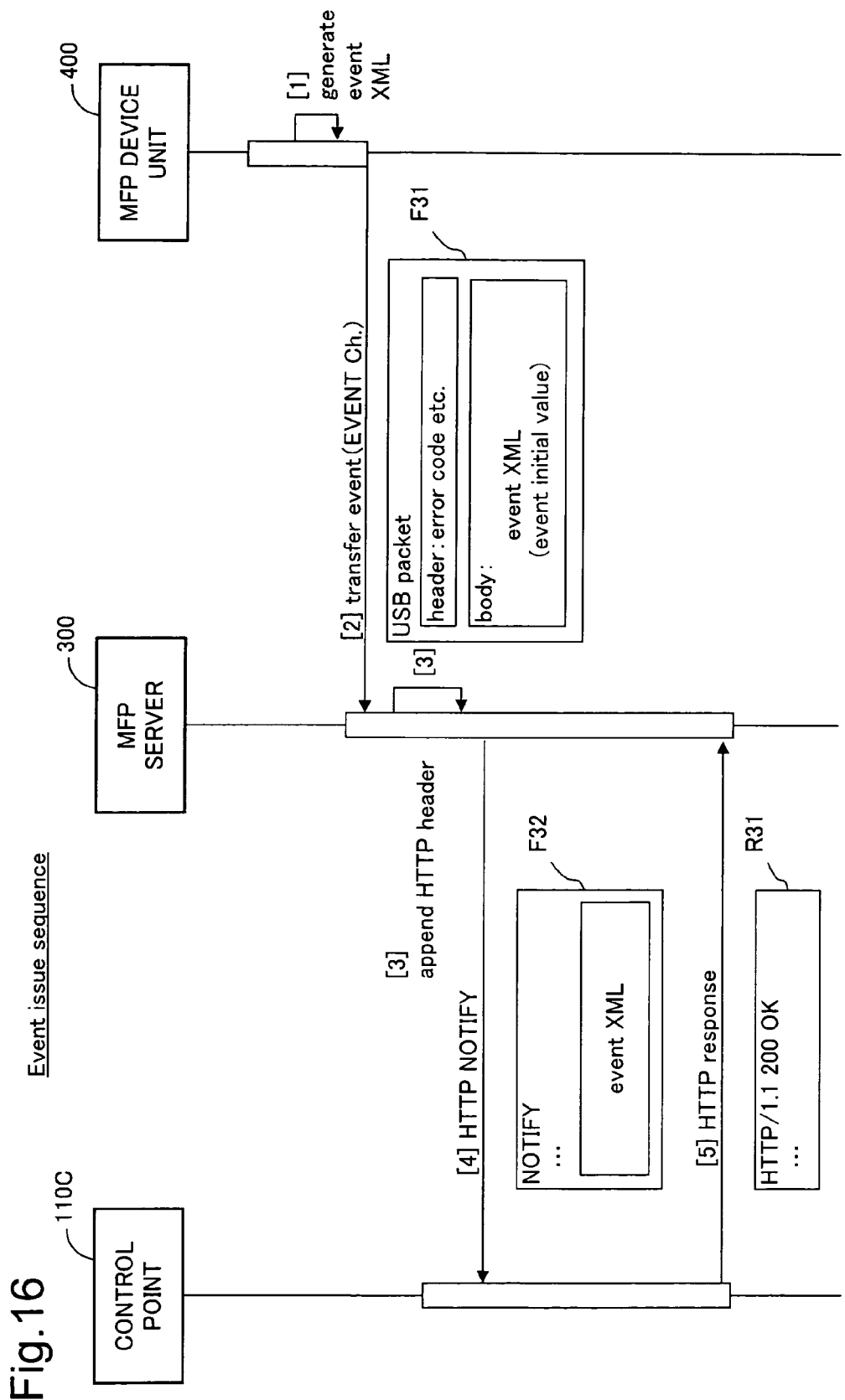

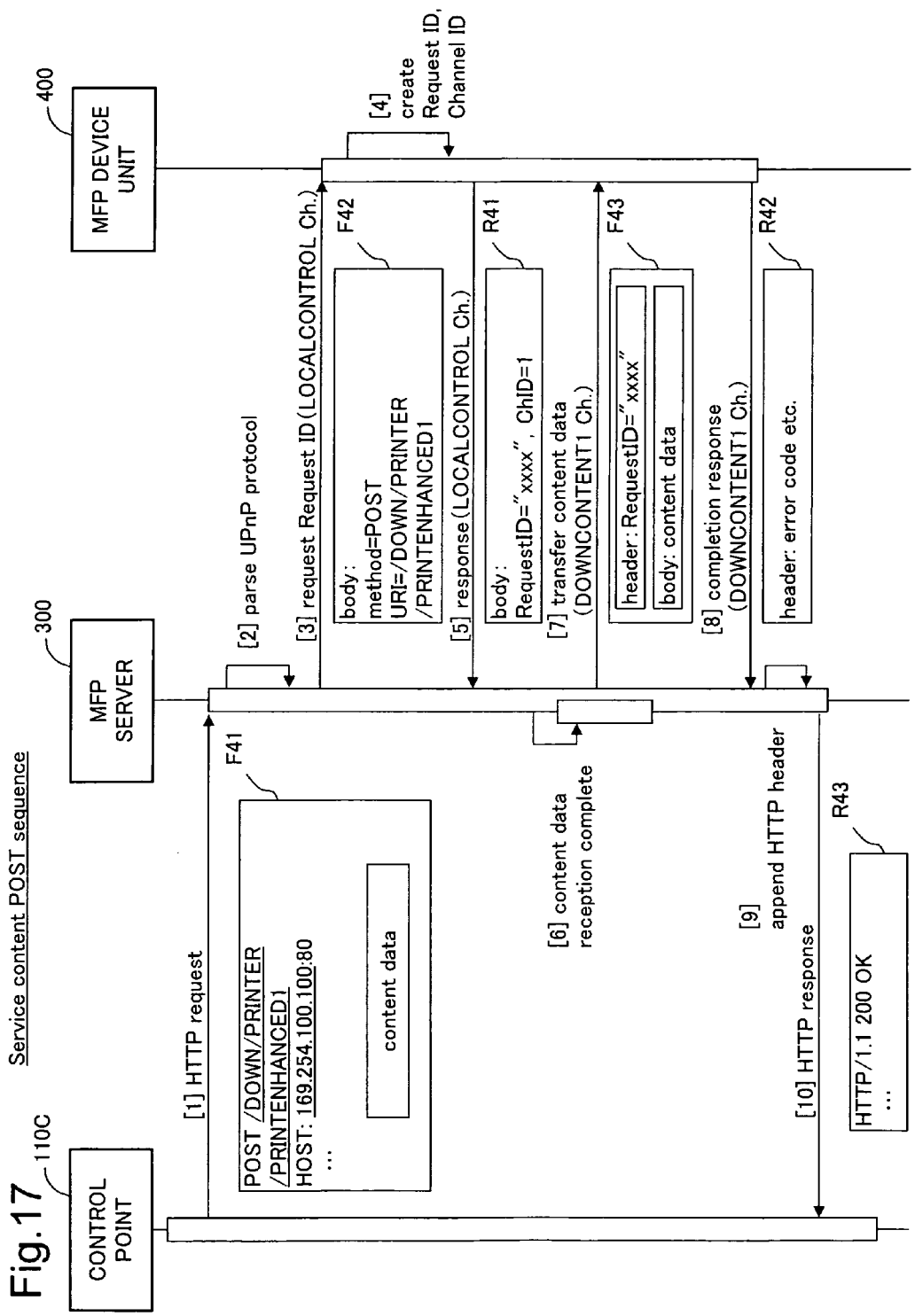

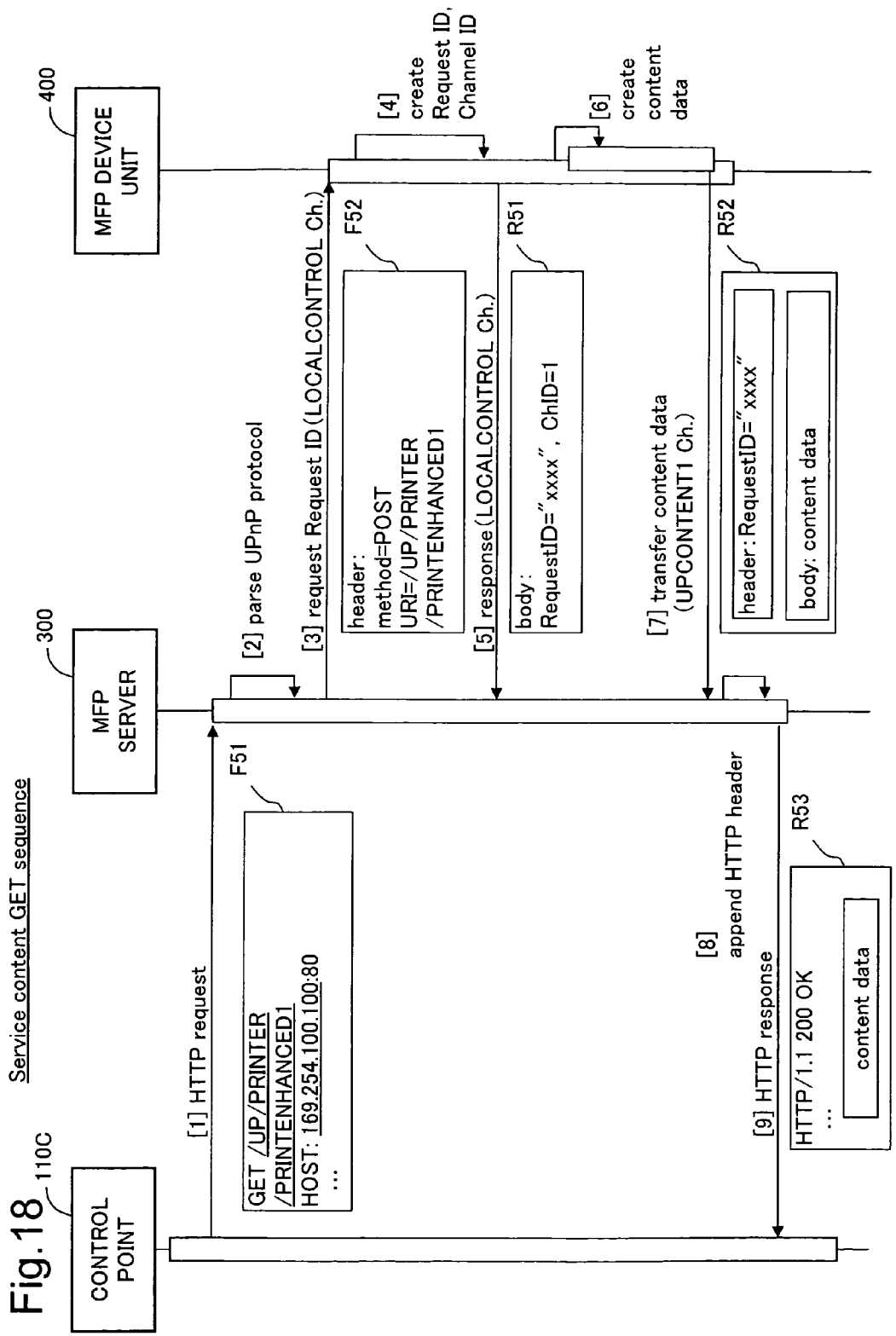

Fig. 19  Data transfer sequence to UPnP storage device

CONTROL POINT — 110C
MFP SERVER — 300
MFP DEVICE UNIT — 400

[1] HTTP request

F61:
POST /DOWN/PRINTER/CDH
HOST: 169.254.100.100:80
...
content data

[2] parse UPnP protocol

[3] request Request ID (LOCALCONTROL Ch.)

F62:
body:
method=POST
URI=/DOWN/PRINTER/CDH

[4] create Request ID, Channel ID

[5] response (LOCALCONTROL Ch.)

R61:
body:
RequestID="xxxx", ChID=1

[6] content data reception complete

[7] transfer content data (DOWNCONTENT1 Ch.)

F63:
header: RequestID="xxxx"
body: content data

[8] store content data in storage device

[9] completion response (DOWNCONTENT1 Ch.)

R62:
header: error code etc.

[10] append HTTP header

[11] HTTP response

R63:
HTTP/1.1 200 OK
...

Fig.20 Transfer route to UPnP storage device
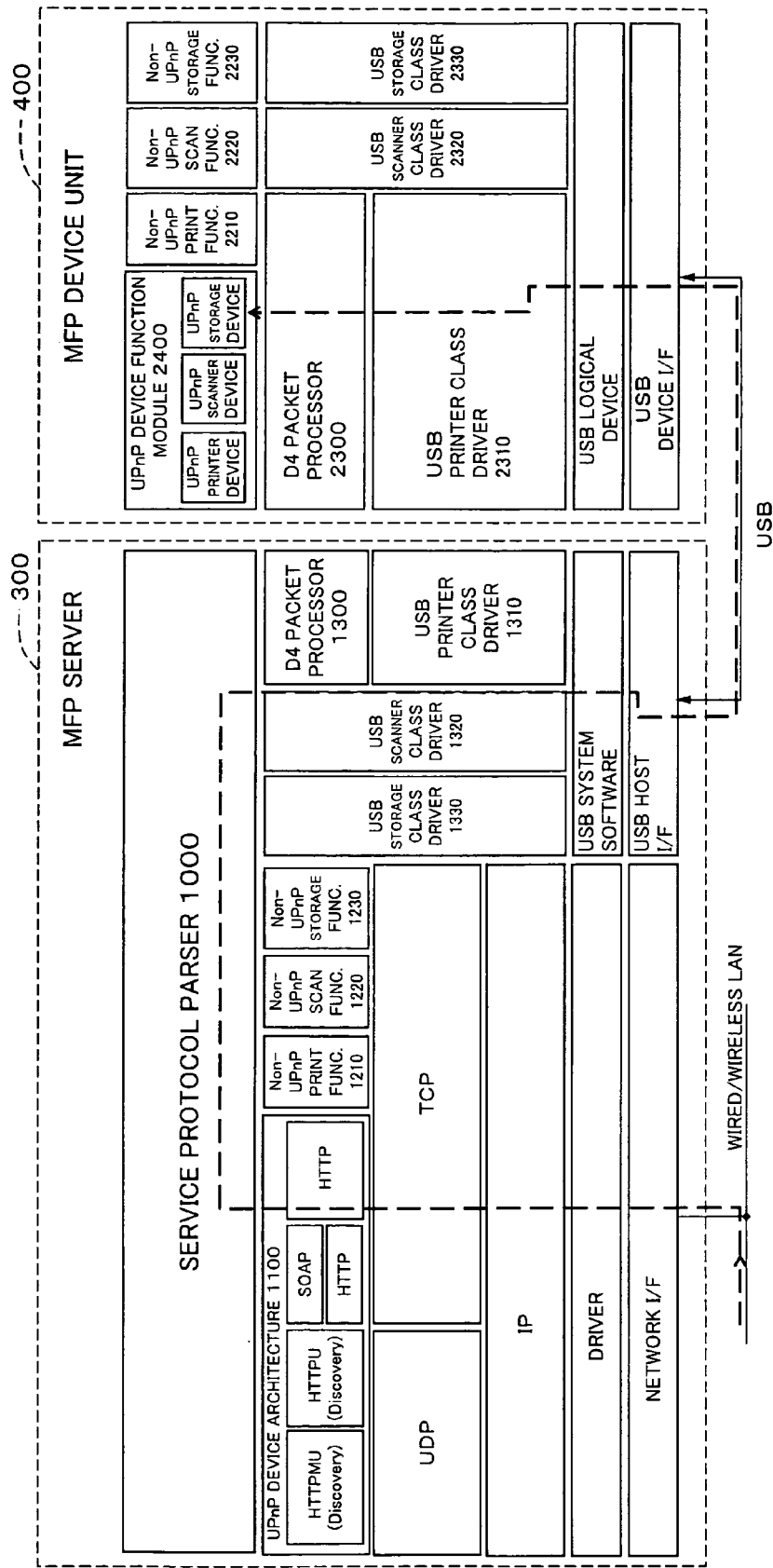

CONTROL OF NETWORK PLUG-AND-PLAY COMPLIANT DEVICE

CROSS-REFERENCE TO RELATED APPLICATIONS

The present application claims the priority based on Japanese Patent Applications No. 2005-259554 filed on Sep. 7, 2005, No. 2005-259561 filed on Sep. 7, 2005, and No. 2005-261979, filed on Sep. 9, 2005, the disclosures of which are hereby incorporated by reference in its entirety.

BACKGROUND OF THE INVENTION

1. Field of the Invention

The present invention relates to control technology for a network device compliant with network plug-and-play.

2. Description of the Related Art

Plug-and-play is a well-known technology that enables peripheral devices to be connected to a computer or disconnected from a computer at arbitrary timing after computer startup. In recent years, extension of plug-and-play technology to networks has led the development of Universal Plug and Play (hereinafter UPnP; UPnP is a trademark of UPnP Implementers Corporation). The use of UPnP enables network devices to be connected to a network or disconnected from the network at arbitrary timing. Herein, the architecture for realizing such plug-and-play capability in a network will be termed "network plug-and-play" in this specification.

UPnP compliant network devices are able to function as service devices of various kinds. Here, "service device" refers to a device for executing a particular service in response to an external request. Service devices can be realized as devices of various kinds, such as a printer, scanner, fax, copier, memory device, camera, clock or the like. It is also possible for the functions of several service devices to be realized by a single device.

In this way, UPnP compliant network devices can take a variety of forms. A problem, however, is that controlling such network devices can easily become complicated.

SUMMARY OF THE INVENTION

An object of the present invention is to provide technology for simplifying control of network plug-and-play compliant network devices.

According to an aspect of the present invention, there is provided a network device compliant with a network plug-and-play protocol. The network device comprises: a plurality of service devices for executing a service in response to a request from a client on the network; a device controller for controlling the plurality of service devices; and a network protocol controller for receiving from a client on the network a message containing a message header and a message body, and for transferring content of the message body to the device controller. The plurality of service devices include a first device, and a second device of different type from the first device. The network protocol controller and the device controller are connected by a packetized logical channel for use by the first device. The network protocol controller, upon having received a message destined for the second device according to the network plug-and-play protocol, transfers the content of the message body of the received message to the device controller, using the packetized logical channel for use by the first device.

According to this network device, when a message destined for the second device is received according to the network plug-and-play protocol, the content of the message body is transferred to the device controller, using the packetized logical channel for use by the first device. Consequently, in the event that messages destined for the second device are sent from multiple clients, these can be forwarded to the device controller, while using the packet structure to identify the respective messages. As a result, it is possible to simplify implementation of the plug-and-play compliant network devices, in relation to forwarding of messages destined for the second device.

According to another aspect of the present invention, there is provided a network device compliant with a network plug-and-play protocol. The network device comprises: one or more service devices for executing a service in response to a request from a client on the network; a device controller for controlling the service device; and a network protocol controller for receiving from a client on the network a message containing a message header and a message body, and for transferring content of the message body to the device controller. The network protocol controller and said device controller are connected by a plurality of logical channels. The network protocol controller selects one of the plurality of logical channels with reference to a highest-order path name which is a highest-order path part within the entire path name representing the destination of the message received from the client; and transfers the content of the message to the device controller using the selected logical channel.

According to this network device, since the network protocol controller transmits the content of the message body over a selected logical channel selected with reference to a highest-order path name, control in the network protocol controller can be simplified.

According to still another aspect of the present invention, there is provided a device comprising a USB host and a USB device. The USB host sends to the USB device query for a channel number of specific-purpose logical channels. The USB device, in response to the query, returns to the USB host a channel number of the specific-purpose logical channels. The USB host opens only the channel number of the specific-purpose logical channels notified by the response. In one embodiment, the USB host is the network protocol controller, and the USB device is the device controller According to this device, it is possible to open only the required number of the various logical channels, without opening any unnecessary logical channels.

The above aspects of the present invention may be implemented in combination or separately.

It is possible for the invention to be reduced to practice in various forms, for example, a network device; a network protocol control device; a control method and a control device for such devices; a computer program for realizing the functions of such a method or device; a recording medium having such a computer program recorded thereon; a data signal containing such a computer program and embodied in a carrier wave; and so on.

These and other objects, features, aspects, and advantages of the present invention will become more apparent from the following detailed description of the preferred embodiments with the accompanying drawings.

BRIEF DESCRIPTION OF THE DRAWINGS

FIGS. 5A and 5B illustrate USB interface/endpoint configuration and logical channel configuration;

FIG. 9 illustrates an example of the device description of a multifunction peripheral device;

FIG. 10 is a sequence diagram depicting the procedure for opening content channels;

FIG. 15 is a sequence diagram of the procedure for a control point to acquire an event initial value;

FIG. 16 is a sequence diagram of the procedure when an event has occurred;

FIG. 17 is a sequence diagram of the procedure where service content is sent from a control point to the multifunction peripheral device;

FIG. 18 is a sequence diagram of the procedure where service content acquired from the multifunction peripheral device by a control point;

FIG. 19 is a sequence diagram of the procedure for transferring a message to the storage device in accordance with UPnP protocol;

FIG. 20 is an illustration of the path for transfer of a message to the storage device in accordance with the UPnP protocol;

DESCRIPTION OF THE PREFERRED EMBODIMENT

The embodiments of the invention are described in terms of certain preferred examples, in the order indicated below.

A. Description of Terms
B. System Overview
C. Multi Function Device Configuration and Device Description
D. Content Channel Opening Sequence
E. Data Transfer Overview
F. Various Data Transfer Sequences to Printer Device
G. Data Transfer Sequence to Service Devices Other than Printer Device
H. Other Embodiments
I. Variation Examples

A. Description of Terms

The meanings of certain terms used in the following description are as follows.

DHCP (Dynamic Host Configuration Protocol): a protocol for dynamically assigning IP addresses.

GENA (General Event Notification Architecture): In UPnP architecture, used when an event is issued.

HTTP (HyperText Transfer Protocol): the hypertext transfer protocol.

HTTPMU (HTTP Multicast over UDP): HTTP multicasting using UDP (User Datagram Protocol).

HTTPU (HTTP (unicast) over UDP): HTTP unicasting using UDP.

MFP (Multi Function Peripheral): A multi function peripheral device having the functions of several devices.

SOAP (Simple Object Access Protocol): In UPnP architecture, used for action request and response by RPC (Remote Procedure Call).

SSDP (Simple Service Discovery Protocol): In UPnP architecture, used for service discovery (detection).

UPnP (Universal Plug and Play): trademark of UPnP Implementers Corporation.

URI (Uniform Resource Identifier): a broader concept of URL (Uniform Resource Locator); an identifier indicating the unique location of a resource.

XHTML (extensible HyperText Markup Language): A type of text markup language compatible with HTML, representing one implementation of XML. XHTML-print, discussed later, is a standard for printing XHTML documents.

XML (extensible Markup Language): extensible Markup Language

The numerous protocols mentioned above are used in UPnP, and will herein be referred to collectively as "UPnP protocols."

B. System Overview

Figure 1:
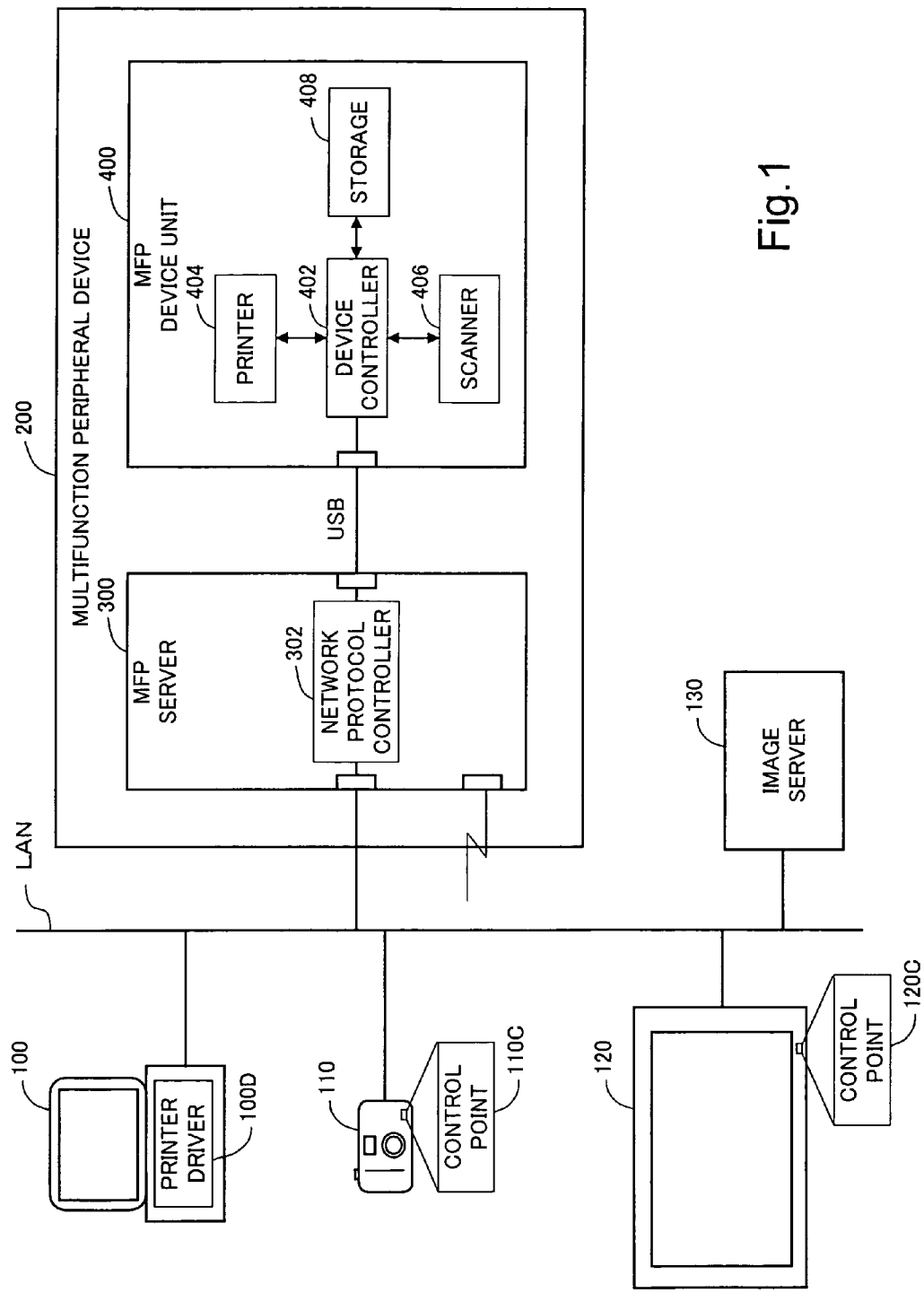
FIG. 1 is a conceptual diagram depicting the configuration of a network system implementing an embodiment of the invention.

FIG. 1 is a conceptual diagram depicting the configuration of a network system implementing an embodiment of the invention. This network system comprises a personal computer 100, a digital camera 110, a TV set 120, an image server 130, and a multifunction peripheral device 200, interconnected via a LAN. The LAN may be a wired network such as IEEE 802.3, or a wireless network such as IEEE 802.11 b/g/a. The digital camera 110, the TV set 120, and the multifunction peripheral device 200 are UPnP compliant network devices. The digital camera 110 and the TV set 120 comprise control points 110C, 120C in UPnP architecture. UPnP architecture and control points will be discussed later. While the personal computer 100 and the image server 130 are one element in this network system, they are not UPnP compliant.

The personal computer 100 has the function of creating print data for images using a printer driver 100D, and of transferring this print data via the LAN to the multifunction peripheral device 200 which prints it. During this printing process, the multifunction peripheral device 200 does not use the UPnP protocol, but rather functions as an ordinary network printer. As will be discussed later, in the event that printing is carried out in accordance with a request from a control point (e.g. 110C), the multifunction peripheral device 200 will function as a UPnP compliant printer device.

The multifunction peripheral device 200 includes an MFP server 300 and an MFP device unit 400. The MFP server 300 functions as a network protocol controller 302 for mediating messages exchanged between the MFP device unit 400 and other devices on the LAN. As will be discussed later, in a typical case, during message transfer the MFP server 300 interprets the UPnP protocol in relation to the message header but neither interprets nor processes the message body. The MFP device unit 400 comprises three service devices (a printer 404, a scanner 406, and storage 408) and a device controller 402 for controlling these. Other services besides the printer 404 scanner 406, and storage 408 may be added. The MFP server 300 and the MFP device unit 400 are connected by a USB (Universal Serial Bus). However, it is possible for the two to be connected by some other physical interface.

UPnP is an architecture whereby it is possible to connect a network device to a network or disconnect it from the network, at arbitrary timing. The UPnP network is composed of the control points 110C, 120C and the devices 404, 406, 408. Here, "device" refers to a device which provides a service. Unless indicated otherwise herein, "device" and "service device" are used as synonyms. A "control point" means a controller that detects or controls a service device on the network, and functions as a client for the service device. The various functions of UPnP compliant network devices will be discussed later.

Figure 2:
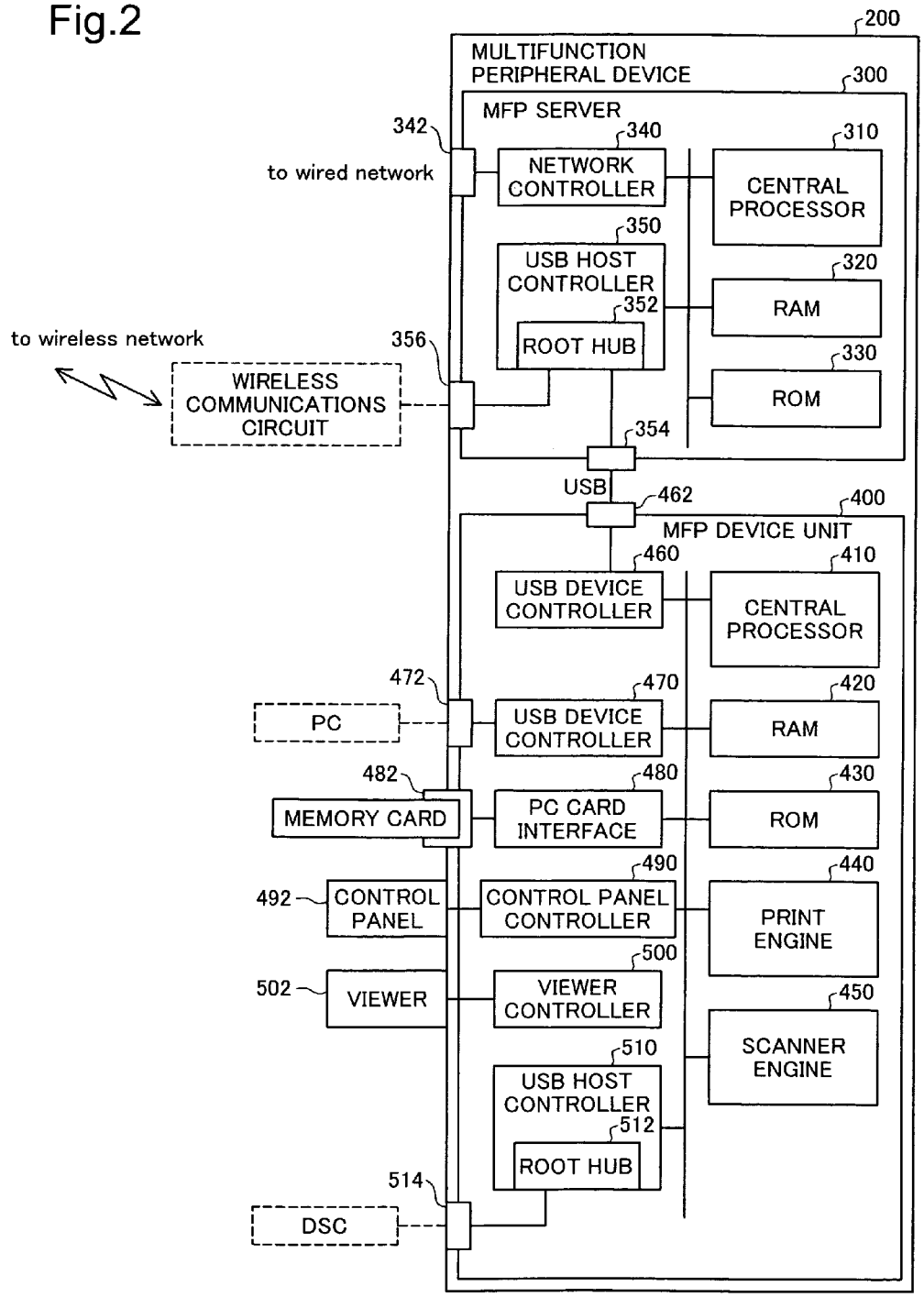
FIG. 2 is a block diagram depicting the internal arrangement of the multifunction peripheral device.

FIG. 2 is a block diagram depicting the internal arrangement of the multifunction peripheral device 200. The MFP server 300 has a central processor (CPU) 310, RAM 320, ROM 330, a network controller 340, and a USB host controller 350. The network controller 340 is connected to a wired network via a connector 342. The USB host controller 350 has a root hub 352, with two USB connectors 354, 356 provided to the root hub 352. The first USB connector 354 connects via a USB cable to the USB connector 462 of the MFP device unit 400. An additional device (e.g. a wireless communication circuit for communicating with a wireless LAN network) can be connected to the second USB connector 463.

The MFP device unit 400 has a central processor (CPU) 410, RAM 420, ROM 430, a print engine 440, a scanner engine 450, two USB device controllers 460, 470, a PC card interface 480, a control panel controller 490, a viewer controller 500, and a USB host controller 510.

The print engine 440 is a printing mechanism for executing printing according to print data presented to it. In this embodiment, where the control points 110C, 120C issue a printing request with XHTML data, the central processor 410 interprets the XHTML data, executes color conversion and halftone processing to create print data, and then sends this print data to the print engine 440. However, it would be possible to have an arrangement whereby the print engine 440, rather than the central processor 410, has the color conversion and halftone processing functions. On the other hand, where printing is requested from the personal computer 100, the page description language produced by the printer driver 100D (FIG. 1) is parsed by the central processor 410 to create print data, which is sent to the print engine 440. "Print data" herein refers to data representing a printout by means of dot data indicating dot on/off state on a printing medium. Print data is composed of control commands unique to the printer. XHTML is not print data, but it is a document markup language for describing documents. The scanner engine 450 is a mechanism for scanning an image and creating image data.

The first USB device controller 460 of the MFP device unit 400 connects via the USB connector 462 to the USB host controller 350 of the MFP server 300. The second USB device controller 470 has a USB connector 472, which can be connected to any USB host such as a personal computer. The PC card interface 480 has a PC card slot 482. An control panel 492 serving as input means is connected to the control panel controller 490. A viewer 502 serving as image display means is connected to the viewer controller 500. A user can input various instructions using the control panel 492, while viewing an image and a menu displayed on the viewer 502. The USB host controller 510 has a root hub 512, with a USB connector 514 provided to the root hub 512. A digital camera or other USB device compliant with CIPA DC-001-2003 (a standard of the Camera & Imaging Product Association) or the like can be connected to this connector 514.

The central processor 310, the network controller 340, and the USB host controller 350 of the MFP server 300 function as the network protocol controller 302 in FIG. 1. More specifically, the network controller 340 carries out sending and receiving of messages according to the various network protocols. The central processor 310 interprets or parses the UPnP protocol and determines the transfer destination. The USB host controller 350 transfers messages with the MFP device unit 400. These controllers 310, 340, 350 transfer messages without interpreting (parsing) or processing the message body.

The USB device controller 460 and the central processor 410 of the MFP device unit 400 function as the device controller 402 in FIG. 1. More specifically, the USB device controller 460 carries out sending and receiving of messages according to USB transfer protocol. The central processor 410 interprets or parses the content of messages transferred via the MFP server 300, executes processing in response to message content, and operates the print engine 440 or the scanner engine 450. The print engine 440 corresponds to the hardware portion of the printer 404 of FIG. 1, and the scanner engine 450 corresponds to the hardware portion of the scanner 406 of FIG. 1. The memory card inserted in the slot 482 of the PC card interface 480 corresponds to the hardware portion of the storage 408 of FIG. 1.

Figure 3:
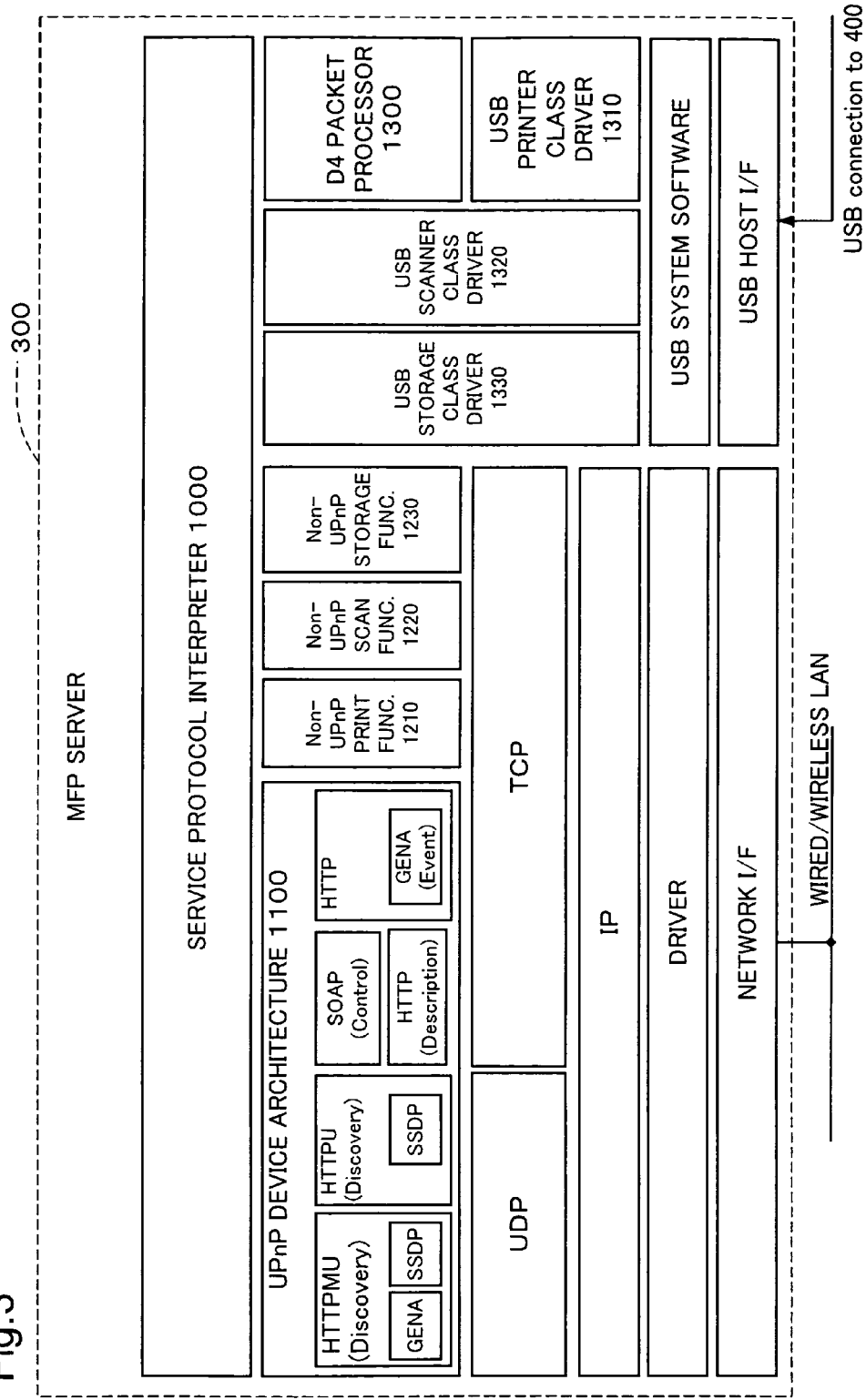
FIG. 3 is a block diagram showing the hierarchical structure of the protocols of an MFP server.

FIG. 3 is a block diagram showing the hierarchical structure of the protocols of the MFP server 300. The MFP server 300 comprises a service protocol interpreter 1000 for interpreting the various network protocols. Under the service protocol interpreter 1000 there are provided network architecture layers and USB architecture layers. The network architecture layers include a UPnP device architecture 1100, and three non-UPnP device function modules 1210, 1220, and 1230. Below these are a UDP layer or TCP layer, an Internet protocol (IP) layer, a driver layer, and a network interface layer.

The USB architecture layers of the service protocol interpreter 1000 include a D4 packet processor 1300, a USB printer class driver 1310, a USB scanner class driver 1320, and a USB storage class driver 1330. Below these three device drivers 1310, 1320, 1330 are USB system software and a USB host interface (hardware). As will be understood from the drawing, the USB printer class driver 1310 performs data transfer using the "D4 packet" (the packet structure according to IEEE 1284.4), while the scanner class driver 1320 and the storage class driver 1330 do not use the D4 packet. The reason is that while the D4 packet is employed as the high-level protocol for the printer class, for the scanner class and storage class, on the other hand, a control stack (the architecture from the application layer to the physical layer) that does not use the D4 packet is standard in the OS.

UPnP architecture is composed according to various protocols such as HTTPMU, HTTPU, SOAP/HTTP, and HTTP. UPnP uses these protocols in accomplishing various processes such as the following.

(1) Addressing

When a UPnP device (hereinafter referred to simply as a "device") is connected to the network, a network address (IP address) is obtained by means of addressing. A DHCP server or Auto-IP is used for addressing. Where the network is equipped with a DHCP server, the device uses an IP address assigned by the DHCP server. Where there is no DHCP server, the device itself decides on an address, using an automatic IP addressing function called Auto-IP. In this embodiment, only a single IP address is assigned to the multifunction peripheral device 200, and the entire multifunction peripheral device 200 is recognized as being a single network device.

(2) Discovery (Detection)

Discovery is a process whereby a control point discovers where devices are located. Discovery can be accomplished by means of multicasting a discovery message by the control point, or by means of advertising the control point from a device that a device has joined the network. Discovery is carried out using HTTPMU/SSDP or HTTPU/SSDP. As a result of discovery, the control point and the device can proceed with processing on a peer-to-peer basis.

(3) Description

The specifics of the configuration of a device are described in XML by way of a device description. The specifics of the services provided by a device are described in XML by way of a service description. These descriptions are possessed by individual devices and are provided to a control point. The control point, by means of referring to these descriptions, can ascertain the specifics of a device and its services. An example of device description will be discussed later.

(4) Control

Control is a process whereby a control point transfers to a device a control message that includes an action request, and performs control of the device. Control is carried out using HTTP/SOAP.

(5) Eventing

When a prescribed event occurs, a service in the device notifies the control point that an event has occurred. Upon receiving notification that the event has occurred, the control point "subscribes" to that service. The event is transferred to the subscribing control point. Event notification is carried out using HTTP/GENA.

(6) Presentation

Presentation is a process wherein a control point acquires a presentation page described in HTML, from a presentation URL registered in the device description. By means of presentation, the control point can display the state of various devices, for example.

The present invention is applicable to future versions of UPnP as well. The present invention is also applicable to network plug-and-play standards other than UPnP, provided that the network plug-and-play standard enables peer-to-peer communication between any control point and device by means of addressing (automatic IP address determination) and device discovery, and that the architecture is one in which control points and devices exchange messages.

Figure 4:
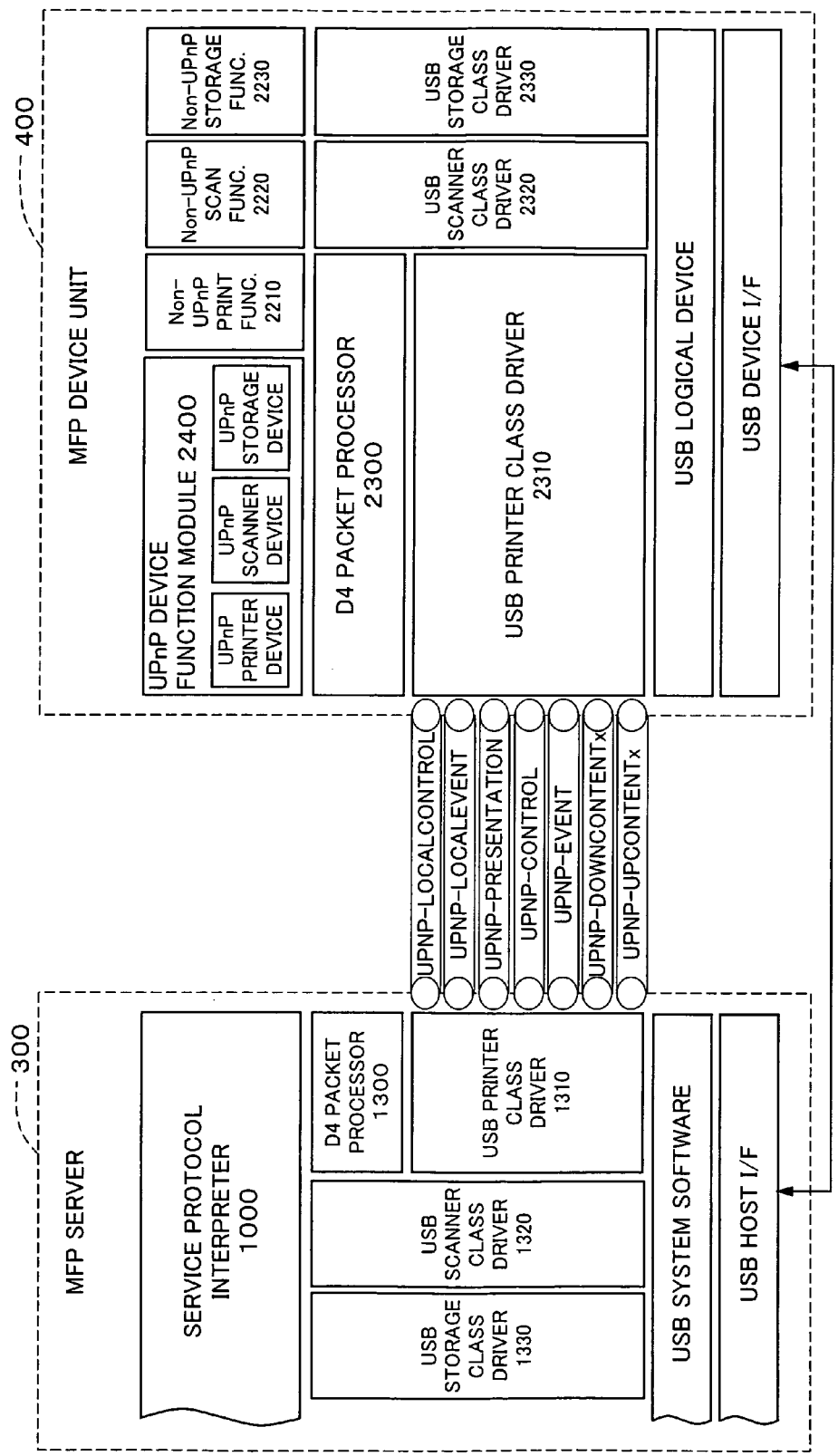
FIG. 4 is a block diagram showing the hierarchical structure of the protocols of an MFP device unit.

FIG. 4 is a block diagram showing the hierarchical structure of the protocols of the MFP device unit 400. The MFP device unit 400 has a UPnP device function module 2400, and three non-UPnP device function modules 2210, 2220, 2230. The UPnP device function module 2400 includes three UPnP device modules (the printer 404, scanner 406, and storage 408 of FIG. 1). The device modules include service modules for executing services, but these are not depicted in the drawing.

Below the UPnP device function module 2400 and the non-UPnP device function module 2210 are a D4 packet processor 2300 and a USB printer class driver 2310. Below the non-UPnP scanner function module 2220 and the non-UPnP storage function module 2230 are a USB scanner class driver 2320 and a USB storage class driver 2330. Below the three device drivers 2310, 2320, 2330 are a USB logical device and a USB device interface (hardware). As will be apparent from this hierarchical structure as well, when the UPnP scanner device or UPnP storage device performs a service for a control point, data transfer between the MFP server 300 and the MFP device unit 400 takes place utilizing the USB printer class driver 2310. Accordingly, D4 packets can be utilized during data transfer for the UPnP scanner device or UPnP storage device as well.

As shown in FIG. 4, seven bidirectional communication channels are provided between the USB printer class driver 1310 of the MFP server 300 and the USB printer class driver 2310 of the MFP device unit 400. These are logical channels that use D4 packets, intended to be used when the multifunction peripheral device 200 functions as a UPnP device. Likewise, between the service protocol interpreter 1000 and the UPnP device function module 2400 there are seven UPnP logical channels corresponding to the seven logical channels between the printer class drivers 1310, 2310; however, these are omitted from the drawing in FIG. 4. The following description turns first to the logical channels using D4 packets.

FIGS. 5A and 5B illustrate a USB interface/endpoint configuration and a logical channel configuration. Typically, a USB device will have an interface and endpoints. A USB transfer takes place between an endpoint and a USB host. That is, an "endpoint" is a logical resource for communication with a host. In the example of FIG. 5A, seven endpoints EP#0-EP#6 are shown. The Control endpoint EP#0 is an endpoint for sending and receiving standard device requests. A "standard device request" is a basic request needing to be supported by all USB devices. Accordingly, the Control endpoint EP#0 must always be provided for a USB device.

The BulkOut endpoint EP#1 and BulkIn endpoint EP#2 for the printer are endpoints for sending and receiving of messages for use by the print engine 440. Similarly, the BulkOut endpoint EP#3 and BulkIn endpoint EP#4 for the scanner are endpoints for sending and receiving of messages for use by the scanner engine 450. The endpoint EP#5 and endpoint EP#6 for the storage are endpoints for sending and receiving of messages for use by a memory card. Typically, in a USB device, endpoints other than the Control endpoint EP#0 are implemented by logical interfaces. In the example of FIG. 5A, a printer interface IF#0, a scanner interface #1, and a storage interface #2 are provided as logical interfaces.

In this embodiment, as depicted in FIG. 5B, the printer interface IF#0 is provided with nine logical channels. The functions of these channels are as follows.

(1) PRINT-DATA channel CH#11: a channel for sending and receiving print data transferred from the printer driver 100D (FIG. 1) using the Print port (a an LPR port number, or port #9100), from a personal computer 100 on the network. This channel is not shown in FIG. 4.

(2) PRINT-STATUS channel CH#12: a channel for the MFP server 300 to send and receive information indicating the status of the print engine 440; provided from the MFP server 300 to a personal computer 100 on the network by means of a protocol such as SNMP. This channel is not shown in FIG. 4.

(3) UPNP-LOCALCONTROL channel CH#21: a UPnP channel for communication between the MFP server 300 and the MFP device unit 400, where the MFP server 300 is the requester and the MFP device unit 400 is the responder. Using this channel, the MFP server 300 can acquire information of various kinds from the MFP device unit 400.

(4) UPNP-LOCALEVENT channel CH#22: a UPnP channel for communication between the MFP server 300 and the MFP device unit 400, where the MFP device unit 400 is the requestor and the MFP server 300 is the responder. Using this channel, the MFP server 300 can be notified, for example, of a change in settings made by the user. When the MFP device unit 400 is powered off, the MFP server 300 is notified of a UPnP termination request.

(5) UPNP-PRESENTATION channel CH#23: a channel for sending and receiving UPnP presentation data (Web page data). It is also possible to separately provide a channel for sending presentation data from the MFP device unit 400 to a control point in response to a request from the control point (down channel), and another channel for uploading new presentation data from a control point to the MFP device unit 400 (up channel).

(6) UPNP-CONTROL channel CH#24: a channel for sending and receiving data relating to an action issued by a control point according to the UPnP protocols. The reason for appending the "LOCAL" prefix to the aforementioned "UPNP-LOCALCONTROL" channel CH#21 is that this channel CH#21 is not used to transfer content of an action from a control point. In other words, the UPNP-CONTROL channel CH#24 is used only for the purpose of sending and receiving data relating to an action issued by a control point.

(7) UPNP-EVENT channel CH#25: a channel for sending an event to a subscribing control point according to the UPnP protocols. The reason for appending the "LOCAL" prefix to the aforementioned UPNP-LOCALEVENT channel CH#22 is that this channel CH#22 is not used to send an event to a control point. In other words, the UPNP-EVENT channel CH#25 is used only for the purpose of sending an event that has occurred in the multifunction peripheral device 200 to a control point.

(8) UPNP-DOWNCONTENTx channel CH#26x: a channel used for sending and receiving during downloading of content data from a control point to the MFP device unit 400 according to the UPnP protocols. Here, the suffix "x" denotes the x-th channel among a number Ndown UPNP-DOWNCONTENT channels where Ndown is an integer equal to 2 or greater. While the number Ndown of useable UPNP-DOWNCONTENTx channels may be any number equal to 1 or greater, in preferred practice the value will be 2 or greater. By setting Ndown a value of 2 or greater, multiple streams of control content data can be received in parallel.

(9) UPNP-UPCONTENTx channel CH#27x: a channel used for sending and receiving during uploading of content data from the MFP device unit 400 to a control point according to the UPnP protocols. Here, the suffix "x" denotes the x-th channel among a number Nup UPNP-UPCONTENT channels where Nup is an integer equal to 2 or greater. The number Nup of UPNP-UPCONTENTx channels may be the same as, or different from, the number Ndown of UPNP-DOWNCONTENTx channels. The total number of UPnP logical channels of FIG. 5B can be understood to be (5+Ndown+Nup).

Each logical channel can perform bidirectional communication utilizing both the BulkOut endpoint EP#1 and the BulkIn endpoint EP#2. Logical channel identifying information is registered in the D4 packet header described later in detail.

The endpoints EP#3, EP#4 of the scanner interface IF#1 are used for communication via logical channels between the scanner class drivers 1320, 2320 (FIG. 4). The endpoints EP#5, EP#6 of the storage interface IF#2 are used for communication via logical channels between the storage class drivers 1330, 2330. These logical channels for the scanner and storage differ from the logical channels between the printer class drivers 1310, 2310 (FIG. 5B) in that they are not packetized by means of the D4 packet. It should be noted that in data transfer using either the scanner interface IF#1 or the storage interface IF#2, the USB physical layer packetizes data and commands according to the USB standard.

Figure 6:
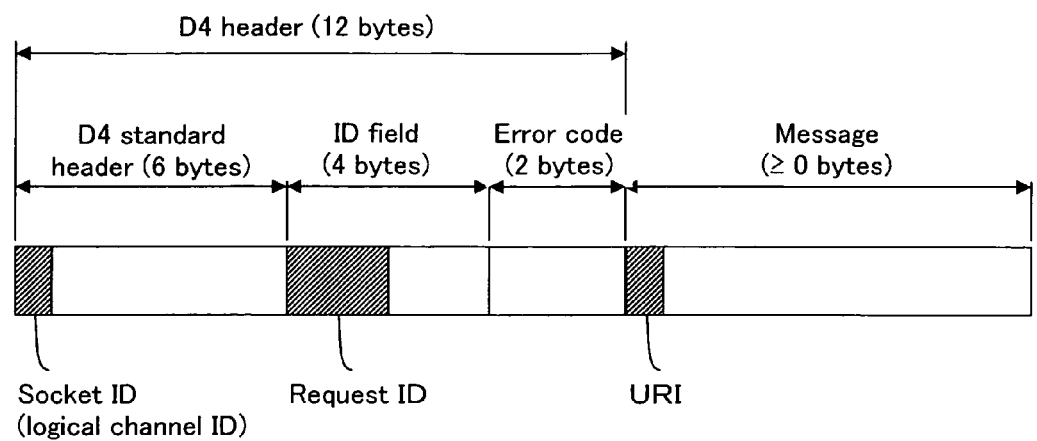
FIG. 6 illustrates the arrangement of a packet used in USB transfer via the printer interface.

FIG. 6 is an illustration depicting the configuration of the D4 packet used in USB transfer via the printer interface IF#0. The packet structure conforms to the IEEE 1284.4 standard. This D4 packet is composed of a 12-byte header, and a message composed of 0 or more bytes. The header contains the 6-byte D4 standard header, a 4-byte ID field, and a 2-byte error code field. In the D4 standard header is registered a socket ID (a logical channel ID) for identifying one of the 9 types or (7+Ndown+Nup) pieces of logical channels depicted in FIG. 5B. A request ID is registered in the ID field. This request ID is used for the purpose of identifying packets making up a given message during data transfer, particularly over the UPNP-DOWNCONTENTx channel and the UPNP-UPCONTENTx channel, between the MFP server 300 and the MFP device unit 400. In some instances the request ID is assigned by the MFP server 300, while in other instances it is assigned by the MFP device unit 400. Consequently, in preferred practice the request ID will be furnished with a bit (e.g. the most significant bit) for uniquely identifying whether it has been assigned by the MFP server 300 or the MFP device unit 400. This request ID may be also referred to as a "job ID."

In the D4 packet, various logical channels can be identified using the header, thereby making it possible to carry out transmission of various kinds of data using various logical channels. Since the header information other than the D4 standard header can be established arbitrarily to a certain extent, the D4 packets advantageously provide a high degree of freedom in how execution of various controls is designed.

As will be understood from FIG. 4, D4 packets are employed for communication between the printer class drivers 1310, 2310, whereas D4 packets are not employed for communication between the scanner class drivers 1320, 2320 and the storage class drivers 1330, 2330. Consequently, it is possible to attain a wider spectrum of communication with the printer class than with the scanner class or storage class. D4 packets are re-packetized in the physical layer according to the USB standard. This is, D4 packets, in the form of the payload of USB physical layer packets (termed "UBB packets", are enclosed in USB packets (data packets). In this way, the D4 packet processing portions 1300, 2300 can be understood as carrying out packetization in a higher level protocol layer than USB packets.

Where the D4 packet of the embodiment is used for transmitting a request, to the head of the message (also termed the "message header") coming after the error field there is appended a URI (normally a relative URI) notifying the destination or recipient from the message sender. From this URI it is possible for the message recipient to readily determine the content and address of the request. Specific examples of D4 packet messages will be described later.

As shown in FIG. 5B, in this embodiment the print port logical channels C#11-CH#12 and the UPnP logical channels CH#21-CH#27x are provided separately as logical channels for USB transfer. Accordingly, print data being transferred to the MFP device unit 400 via a network print port can be readily distinguished from content data (e.g. XHTML data for printing) being transferred to the MFP device unit 400 via a UPnP port. Additionally, in this embodiment, since a plurality of logical channels CH#21-CH#27x for different applications are provided for the purpose of USB transfer of messages by UPnP protocol, it is possible for processing of message content to be faster on the message receiving end. In this embodiment in particular, apart from the logical channels CH#23-CH#27x used during communication with the control point, there are separately provided logical channels CH#21, CH#22 used for transfer of local information between the MFP server 300 and the MFP device unit 400. Consequently, a message sent from a client or a control point can be readily distinguished from specific information shared between the MFP server 300 and the MFP device unit 400, so processing appropriate for each can be executed rapidly.

Figure 7:
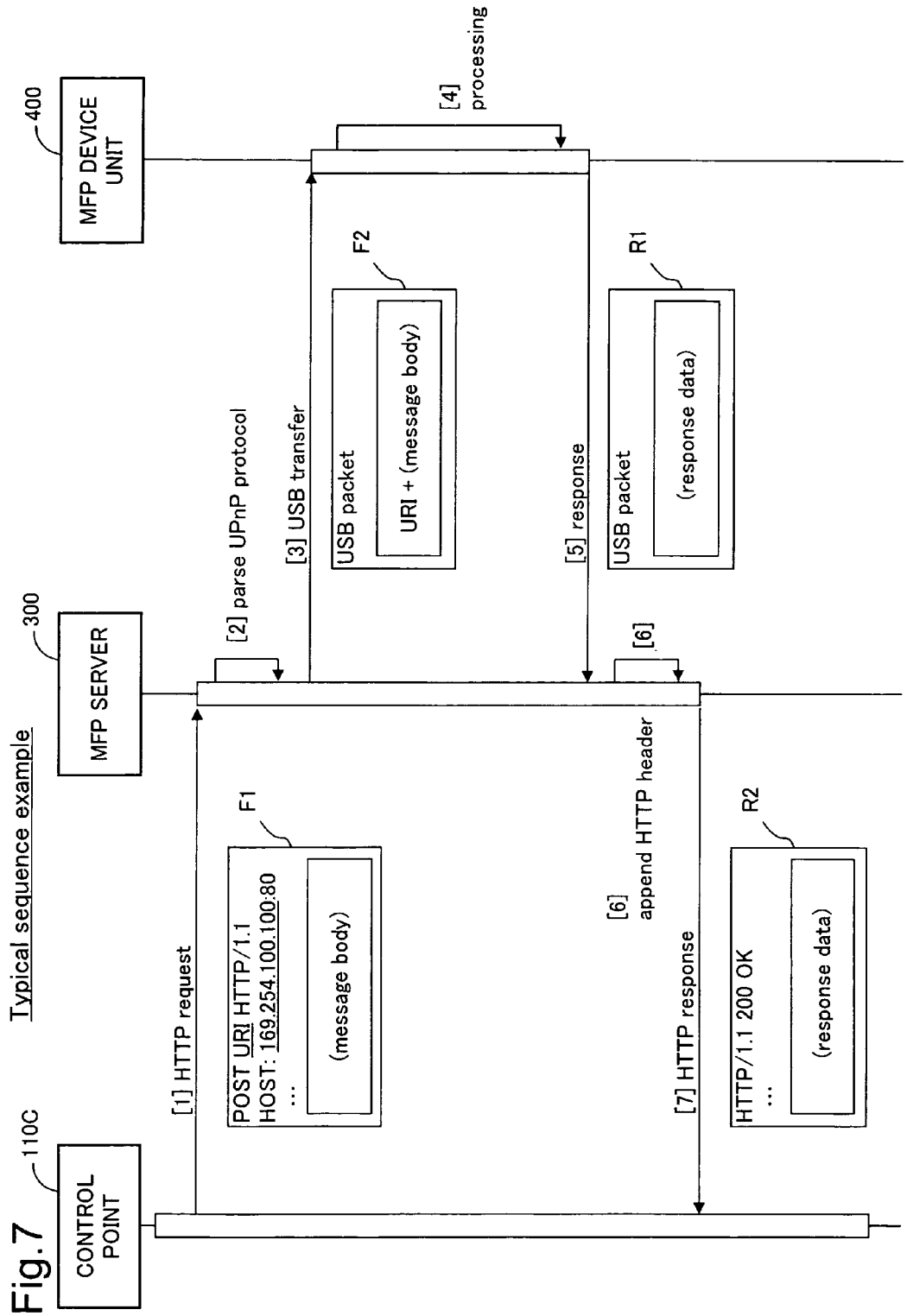
FIG. 7 is a sequence diagram depicting a typical example of a process utilizing UPnP architecture.

FIG. 7 is a sequence diagram depicting a typical example of a process utilizing UPnP architecture. Here, there is depicted an instance of message transfer among a control point 110C, the MFP server 300, and the MFP device unit 400. In Step 1, the control point 110C transfers an HTTP request message F1 to the MFP server 300. It should be noted that the step numbers are enclosed by brackets in the sequence diagrams. The header of the message F1 describes a request command method (e.g. POST or GET), the URI of an address within the MFP device unit 400, and the host name of the multifunction peripheral device 200 (in this example, the IP address "169.254.100.100"). Since the multifunction peripheral device 200 is assigned a single IP address, it is possible to think of this IP address as either the IP address of the MFP server 300 or the IP address of the MFP device unit 400.

In Step 2, the MFP server 300 parses the request message F1. Here, only the header portion of the message F1 is parsed or interpreted; the content of the transmission data (i.e. the message body) is not interpreted. More specifically, in Step 2, the URI of the message F1 is parsed to determine which logical channel should be used for transferring the massage to the MFP device unit 400. In certain instances, however, the request message F1 may lack a substantial message body.

In Step 3, the MFP server 300 transfers the message F2 containing the URI and the message body (where present) to the MFP device unit 400 by USB. During this transfer, a logical channels selected with reference to the URI is used.

In Step 4, the MFP device unit 400 executes processing with reference to the URI and the message body (where present) in the received message F2. This example will be discussed later. In Step 5, the MFP device unit 400 transfers by USB to the MFP server 300 a message R1 which includes response data. In Step 6, the MFP server 300 appends an HTTP header to the transmission data. This HTTP header includes a status code indicating the result of processing the HTTP request. For example, where the process result is OK, the status code is set to "200" whereas if there is an error it is set to "500." In Step 7, an HTTP response message R2 created in this way is transferred from the MFP server 300 to the control point 110C.

In this way, in this embodiment, from a request message received from a control point, the MFP server 300 performs parsing (interpretation) of the header of the message, without interpreting the content of the message body, and the message body is processed by the MFP device unit 400. This arrangement has advantages such as the following. A first advantage is that the MFP server 300 does not need to ascertain the device configuration and service content of the MFP device unit 400, allowing it to function as a network protocol controller for transferring messages destined for a device unit of any configuration. A second advantage is that even if the device configuration or service content of the MFP device unit 400 should change, there is no need to modify the configuration or functions of the MFP server 300. A third advantage is that since there is no need for the MFP server 300 to mount an interpreter or parser for interpreting the content of the message body, a simpler configuration for the MFP server 300 will suffice.

C. Multi Function Device Configuration and Device Description

Figure 8:
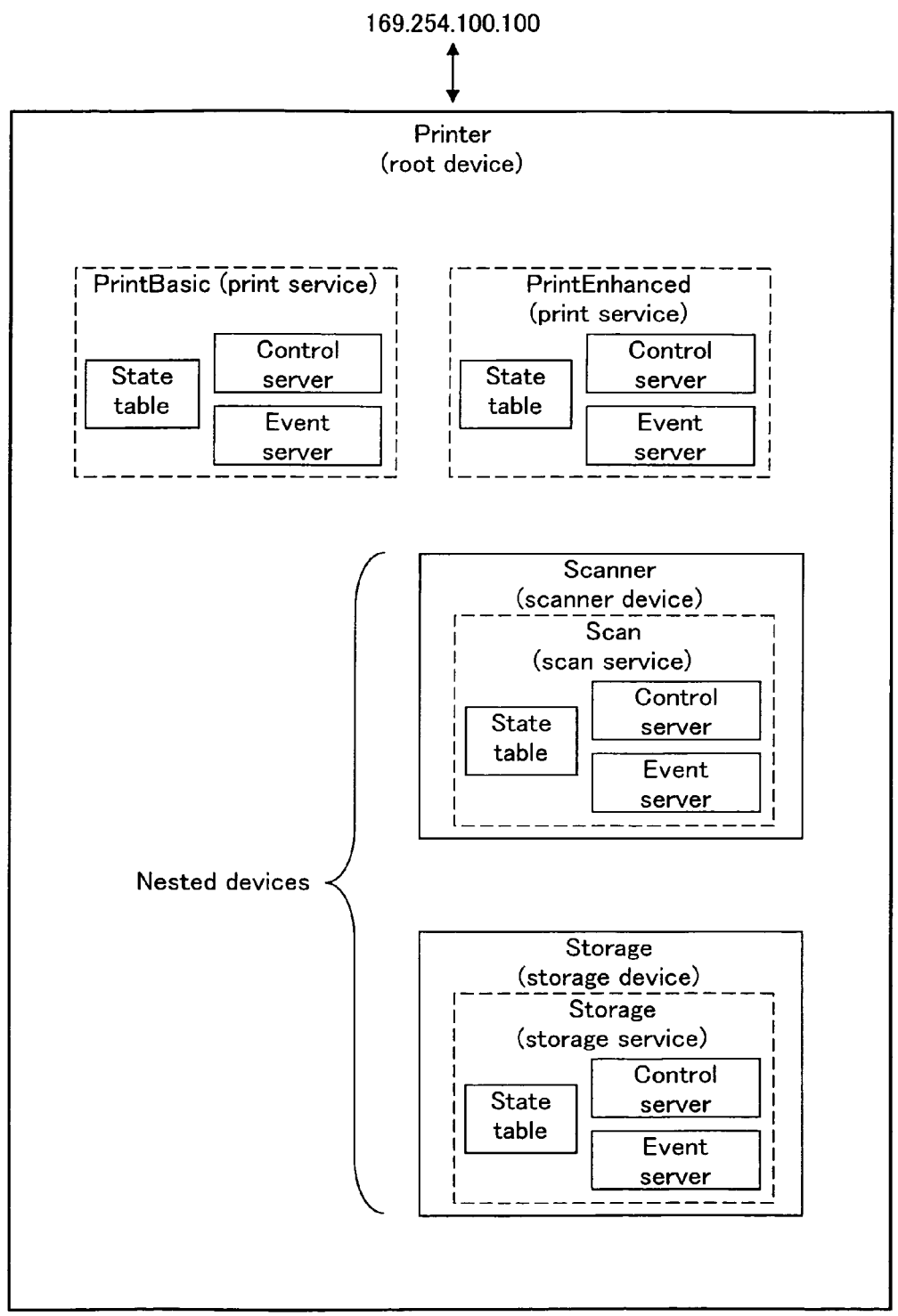
FIG. 8 illustrates UPnP device configuration in an embodiment.

FIG. 8 is an illustration depicting the device configuration of the multifunction peripheral device 200 according to the UPnP protocols. The configuration of the multifunction peripheral device 200 of this embodiment as a UPnP device includes a printer "Printer" serving as the root device, and the printer device "Printer" incorporates a scanner device "Scanner" and a storage device "Storage." In other words, the scanner device "Scanner" and the storage device "Storage" are nested devices within the printer device "Printer." The printer device "Printer" has two print services, "PrintBasic" and "PrintEnhanced." These two services are standard print services standardized according to UPnP. The scanner device "Scanner" has a scan service "Scan," while the storage device "Storage" has a storage service "Storage." Each service is composed of a state table, a control server, and an event server. State variables indicating service states are registered in the state table. The control server receives an action request from a control point and executes a requested process. The event server, in the event of a change in the value of a state variable, notifies the control points of the change, by way of an event. The control points targeted for the notification are those that have previously subscribed to the service.

Herein, a device that includes a service is called a "service device." As will be understood from FIG. 8, it is possible for each service device to include any number of services equal to one or more. It is also possible for a given service device to have a device architecture that includes another service device.

Instead of the configuration depicted in FIG. 8, it would be possible to employ a device configuration whereby a basic device "Basic" standardized according to UPnP, with the three service devices "Printer," "Scanner," and "Storage" juxtaposed within the same layer below this basic device "Basic." This basic device "Basic" may include one or more service devices, but it does not itself execute any unique services, apart from the services executed by the service devices. In this case as well, since the multifunction peripheral device 200 is represented by a single root device "Basic," the advantage that only a single IP address need be assigned to the multifunction peripheral device 200 is preserved.

As shown in FIG. 8, in this embodiment, only a single IP address is assigned to the multifunction peripheral device 200, which has the advantage that the control point, using this single IP address, can access the various service devices of the multifunction peripheral device 200 (and MFP server 300). Another advantage in this embodiment is that since fewer IP addresses are needed as compared to a comparison example, IP address management in the network is simpler.

Each UPnP device stores its own configuration and functions in the form of a device description, and has the function of providing its device description in response to a request from a control point. Service specifics are stored in the device in the form of a service description, which is provided to a control point when requested. In the example of FIG. 8, device descriptions of the three devices and service descriptions of the four services have been stored in advance in the MFP device unit 400.

FIG. 9 depicts an example of the device description of the multifunction peripheral device 200, described in XML. The underlined sections indicate settings unique to this embodiment. The content of the <URLBase> element, i.e., "http://169.254.100.100:80" includes the host name (here, the IP address) of the multifunction peripheral device 200, and a port number for the event that HTTP is used. The various URIs in the description are written as relative addresses with respect to this IP address. Herein, the term URI (or URL) is used to include both instances where written with an absolute address, and instances where written with an relative address. Hereinbelow, a relative address with respect to an IP address shall be called a "path name."

Below the <root> element is a single <device> element; this element in turn includes two <device> elements. The first <device> element is a printer device (root device); the second and third devices below it are a scanner device and a storage device.

The content indicated below is described in the description for the printer device.

<presentation URL>: the URL to be used when a control point acquires the presentation page of the printer device. This URL is composed of the path name "/PRESENTATION/PRINTER."

<serviceList>: a list of services provided by the printer device.

<serviceType>: the types of services provided by the printer. "PrintBasic" and "PrintEnhanced" are standard print services in UPnP architecture.

<SCPDURL>: the path name of the device description for the printer.

<controlURL>: the path name of the control server in the printer device. The control server is a server that provides a control point with a control function (a process wherein a control point transfers to a device a control message that contains an action request, to perform control of the device), and is typically included among the services of a UPnP device.

<eventSubURL>: the path name of the event server within the printer device. The event server is a server for issuing an event to subscribing control points, and is typically provided among device services.

The scanner and storage device descriptions describe items similar to the items for the printer. While device descriptions additionally describe a device friendly name, manufacturer name, model, icons and various other properties, these have been omitted from the illustration here.

D. Content Channel Opening Sequence

FIG. 10 is a sequence diagram depicting the procedure for opening content channels. When the multifunction peripheral device 200 is started up, in Step 1, the MFP server 300 instructs the MFP device unit 400 to open logical channels besides the content channels UPNP-DOWNCONTENTx, UPNP-UPCONTENTx. This instruction is made using the control pipe (i.e. the control endpoint EP#0 in FIG. 5A). Since the purpose and number of logical channels besides the content channels has been determined in advance, at startup the MFP server 300 can open all of these logical channels. In Step 2, all of logical channels instructed by the MFP device unit 400 are opened.

The reason for opening the MFP device unit 400 in response to an instruction from the MFP server 300 is that, with respect to USB connections, the MFP server 300 constitutes a USB host and the MFP device unit 400 constitutes a USB device (FIG. 2).

In Step 3, the MFP server 300 sends to the MFP device unit 400 a query for a channel number of content channels. Specifically, it sends the local request "GetChannelInfo." This query is made over the UPNP-LOCALCONTROL channel, for example. In Step 4, the MFP device unit 400 acquires the required channel number, depending on the implementation of the MFP device unit 400. For example, let it be assumed that the following numbers of channels are required by three service devices. (1) printer: DOWNCONTENTx channels=2, UPCONTENTx channels=1. (2) scanner: DOWNCONTENTx channels=1, UPCONTENTx channels=1. (3) storage: DOWNCONTENTx channels=1, UPCONTENTx channels=1.

In this case, the required number of channels is four UPNP-DOWNCONTENTx channels and three UPNP-UPCONTENTx channels. Consequently, these channel numbers Ndown=4, Nup=3 are stored within ROM 430 (FIG. 2) in the MFP device unit 400, with these values being read out during Step 4.

In Step 5, the MFP device unit 400 responds to the MFP server 300 with the channel numbers Ndown, Nup. In Step 6, the MFP server 300 registers the channel numbers Ndown, Nup, and in Steps 7 and 8 opens UPNP-DOWNCONTENTx channels and UPNP-UPCONTENTx channels in the required numbers Ndown, Nup, respectively.

In this embodiment, since the UPNP-LOCALCONTROL channel is configured such that the MFP server 300 can request information of various kinds regarding actual implementation of the MFP device unit 400, it is possible for the MFP server 300 to request the MFP device unit 400 for the required number of content channels. Since the MFP server 300 then opens UPNP-DOWNCONTENTx channels and UPNP-UPCONTENTx channels in the respective numbers Ndown, Nup sent to it in reply, it is possible for the required number of content channels appropriate to the implementation of the MFP device unit 400 to be opened. Additionally, opening of an unnecessarily large number of content channels can be prevented.

In preferred practice, opening of content channels will be executed at startup of the multifunction peripheral device 200, with the channels being subsequently maintained in the open state. By so doing, it is possible to transfer content data promptly at any time, using any of the plurality of content channels. However, rather than opening all of the content channels during startup of the multifunction peripheral device, it would be acceptable to instead open content channels in response to a request from the MFP server 300 or the MFP device unit 400 where needed.

In FIG. 10, there is described an example in which only the required number of content channels are opened; however, this procedure can be utilized to open logical channels for other purposes as well, and can be utilized generally to open the required number of logical channels for a particular purpose. "Logical channels for a particular purpose" herein refers to predetermined logical channels for a particular type of data for transfer.

E. Data Transfer Overview

Figure 11:
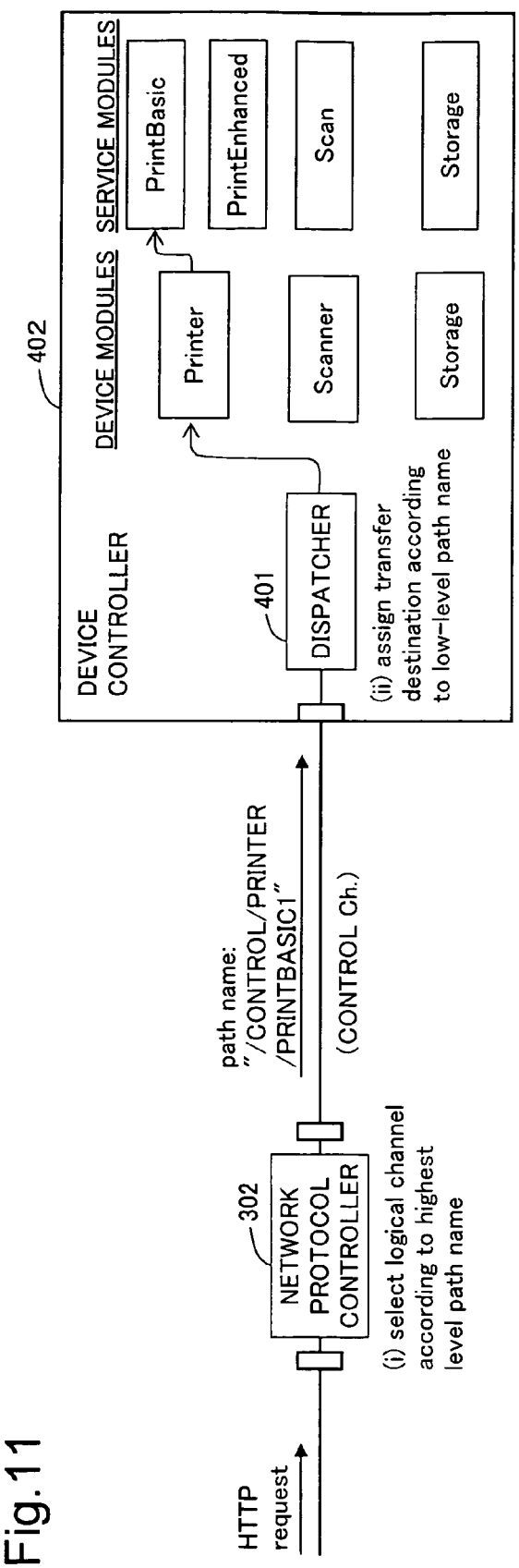
FIG. 11 illustrates the flow of data transfer within a multifunction peripheral device when an HTTP request is received from a control point.

FIG. 11 is an illustration depicting the flow of data transfer within the multifunction peripheral device 200 when a request (HTTP request) is received from a control point. In the case depicted here, the path name of the destination of the HTTP request is "/CONTROL/PRINTER/PRINTBASIC1." Typically, a path name will be composed of one or more layers, with layers being separated by a slash "/". The highest level layer portion of a path name is herein termed the "highest level path name." The portion below the highest level path name is termed the "low-level path name." In the example of FIG. 11, the highest level path name is "/CONTROL" and the low-level path name is "/PRINTER/PRINTBASIC1." In this example, the low-level path name "/PRINTER/PRINTBASIC1" is set to the name value as the path name of the control server (the <controlURL> element) described in the device description shown in FIG. 9.

The first portion "/PRINTER" of this low-level path name is a device name indicating the device module "Printer," while the second portion "/PRINTBASIC1" is a service name indicating the service module "PrintBasic." It is not necessary that the device name and the service name in the path name be the same as the <deviceType> and <serviceType> elements in the device description. In preferred practice, however, correspondence relationships between device modules and device names used in the path name, and relationships between service modules and service names used in the path name, will have been pre-established in the dispatcher 401 (distribution processor) within the device controller 402.

The network protocol controller 302 of the MFP server 300, according to the highest level path name in the HTTP request, selects one of the plurality of UPnP logical channels shown in FIG. 5B. In the example of FIG. 11, since the highest level path name is "/CONTROL" the UPNP-CONTROL channel is selected, and the message body of the request is transferred over this channel from the MFP server 300 to the MFP device unit 400.

The dispatcher 401 within the device controller 402 switches the transfer destination (the device module and service module) according to the low-level path name. Here, since the low-level path name is "/PRINTERIPRINTBASIC1", the "Printer" device module is selected according to the high level layer name "/PRINTER," and the "PrintBasic" service module is selected according to the low level layer name "/PRINTBASIC1." The message body is then presented to this "PrintBasic" service module. In FIG. 11, the path for data transfer within the MFP device unit 400 is indicated by arrows.

Typically, a service module executes the process of a message body; however, there are instances in which a device module, rather than a service module, executes the process (e.g. to create a device description). In the event that such a request is received, the message body of the request is transferred to and processed by the device module according to the low-level path name.

In the embodiment, in the manner discussed above, the network protocol controller 302 selects a logical channel according to the highest level path name of the request destination, whereby an appropriate logical channel can be selected easily from among a large number of logical channels. During this process, the network protocol controller 302 does not need to parse other portions of the path name or the content of the message body, and a resultant advantage is that it suffices to parse the highest level path name only. Additionally, since the device controller 402 switches the transfer destination (the device module and service module) according to the low-level path name of the destination, the request can be delivered easily to the appropriate device module and service module. A resultant advantage is that the device controller 402 need only parse the low level path name.

F. Various Data Transfer Sequences to Printer Device

Figure 12:
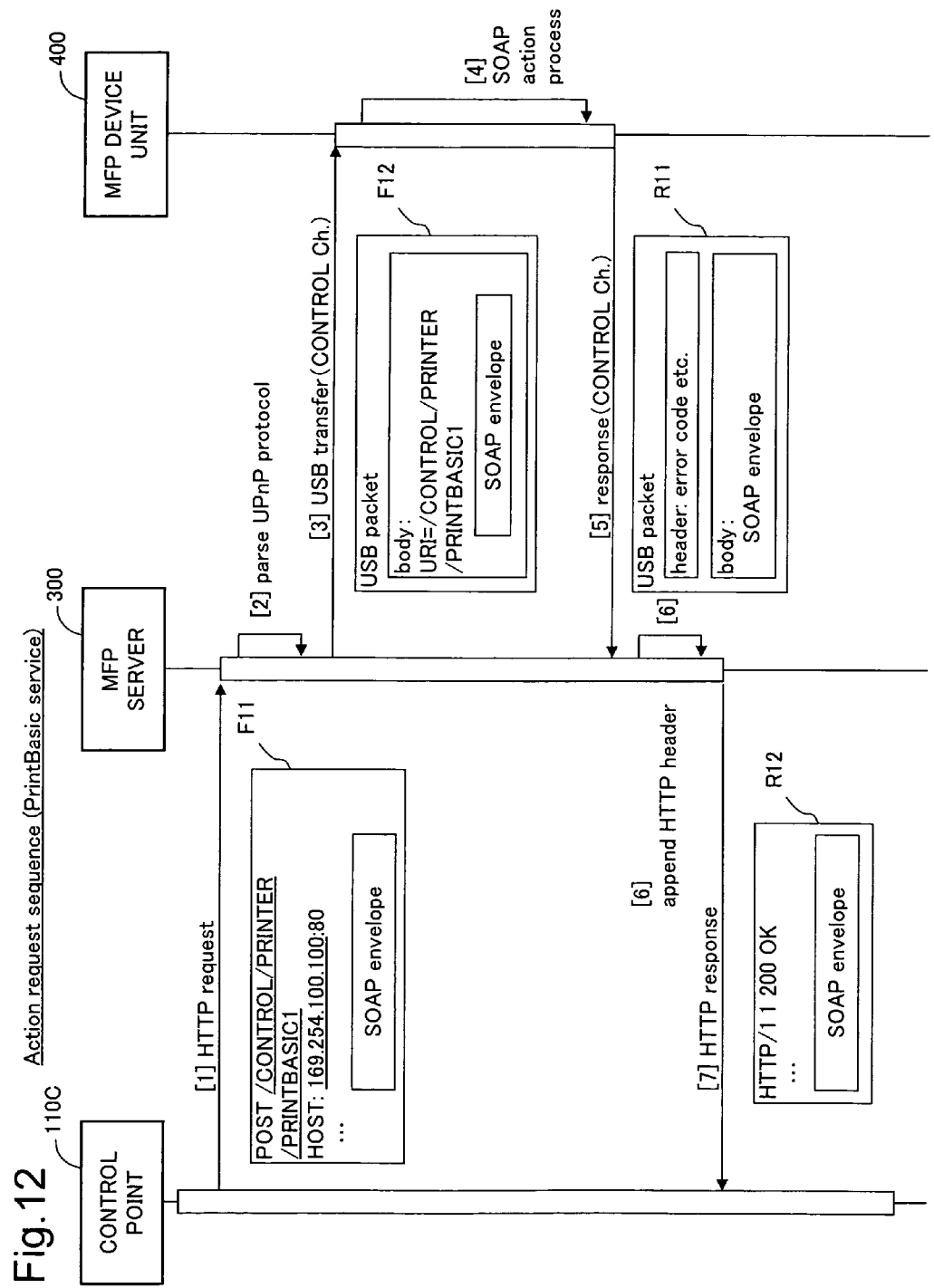
FIG. 12 is a sequence diagram depicting an action request procedure.

FIG. 12 is a sequence diagram depicting the procedure when an action request has been issued from a control point to the multifunction peripheral device 200. In Step 1 of FIG. 12, the control point 110C transfers to the MFP server 300 a request message F11 requesting an action. The header of this request message F11 describes the destination path name "/CONTROL/PRINTER/PRINTBASIC1" and the IP address "169.254.100.100" of the multifunction peripheral device 200. The message body contains a SOAP envelope indicating the content of the action request.

Where the action request is a request to create a new print job ID (a CreateJob command) for example, it is possible to establish printing parameters such as the following, by way of job attributes in the SOAP envelope.

Number of copies
Layout (single-sided, double-sided, device settings etc.)
Paper direction (portrait/landscape, device settings etc.)
Paper size (A4, B4, device settings etc.)
Paper type (plain paper, photo paper, transparency, envelope, device settings etc.)
Print quality (low, normal, high, device settings etc.)

"Device settings" refer to the use of settings made in the multifunction peripheral device 200. Since various printing parameters can be established in the CreateJob command, a user operating a control point can make the multifunction peripheral device 200 execute printing with the desired printing parameters.

In Step 2 of FIG. 12, the MFP server 300 parses the UPnP protocol of the request message F11. Specifically, the MFP server 300 parses the highest level path name "/CONTROL" of the destination and selects the UPNP-CONTROL channel. In Step 3, the MFP server 300, using the UPNP-CONTROL channel, transfers to the MFP device unit 400 a message F12 containing the destination path name and a SOAP envelope. The SOAP envelope in this message F12 is an identical copy of the SOAP envelope sent from the control point.

In Step 4 of FIG. 12, the MFP device unit 400 parses the SOAP action contained in the received message F12, and executes a process according to the SOAP action. For example, where the SOAP action is a print job creation request, there is created a SOAP envelope for response which establishes the delivery destination URI for the document data (XHTML data) indicating the document to be printed. The process according to this SOAP action is executed by the "PrintBasic" service module (FIG. 11) specified by the destination low level path name "/PRINTERIPRINTBASIC1."

In Step 5, the MFP device unit 400 transfers the message R11 containing this SOAP envelope to the MFP server 300. At this time, the same logical channel used in Step 4 (the UPNP-CONTROL channel) is used. In the error code field (FIG. 6) of the message packet R11 is established an error code indicating whether the process in the MFP device unit 400 was successful, etc.

In Step 6, the MFP server 300, referring to the error code of the message R11, appends an HTTP header to the SOAP envelope. In Step 7, the HTTP response message R12 created in this way is transferred from the MFP server 300 to the control point 110C.

Where the action request is a print job creation request, subsequent to Step 7 of FIG. 12, the control point 110C sends the XHTML data to the MFP server 300, and printing is executed in accordance with this; however, the process will not be described here.

Figure 13:
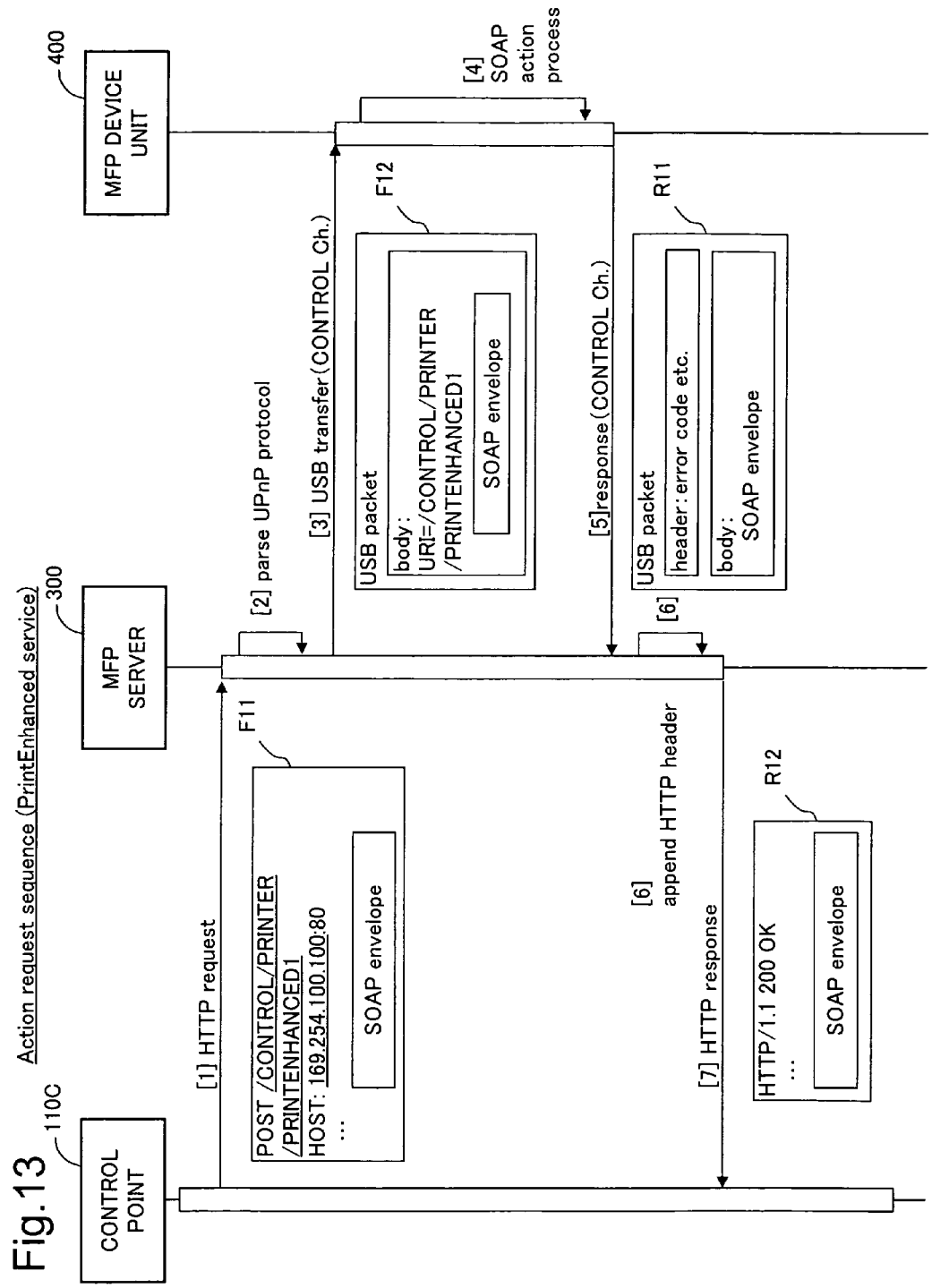
FIG. 13 is a sequence diagram depicting another action request procedure.

FIG. 13 is an illustration of another action request sequence. In the example of FIG. 13, the destination path name is different from that in the example of FIG. 12. Specifically, in FIG. 13 the path name is "/CONTROL/PRINTER/PRINTENHANCED1." The highest level path name "/CONTROL" is the same as in FIG. 12, so the logical channel selected for use will be the same as in FIG. 12. In the low-level path name "PRINTER/PRINTENHANCED1" on the other hand, the portion "/PRINTENHANCED1" corresponding to the service name differs from that of the example of FIG. 12. Consequently, in Step 4 of FIG. 13, the message body is transferred to the "PrintEnhanced" service module (FIG. 11) where it is processed. The low-level path name "PRINTER/PRINTENHANCED1" is set to the same value as the path name of the control server described in the <controlURL> element of the device description shown in FIG. 9. The specifics of the other processes in FIG. 13 are the same as in FIG. 12.

Figure 14:
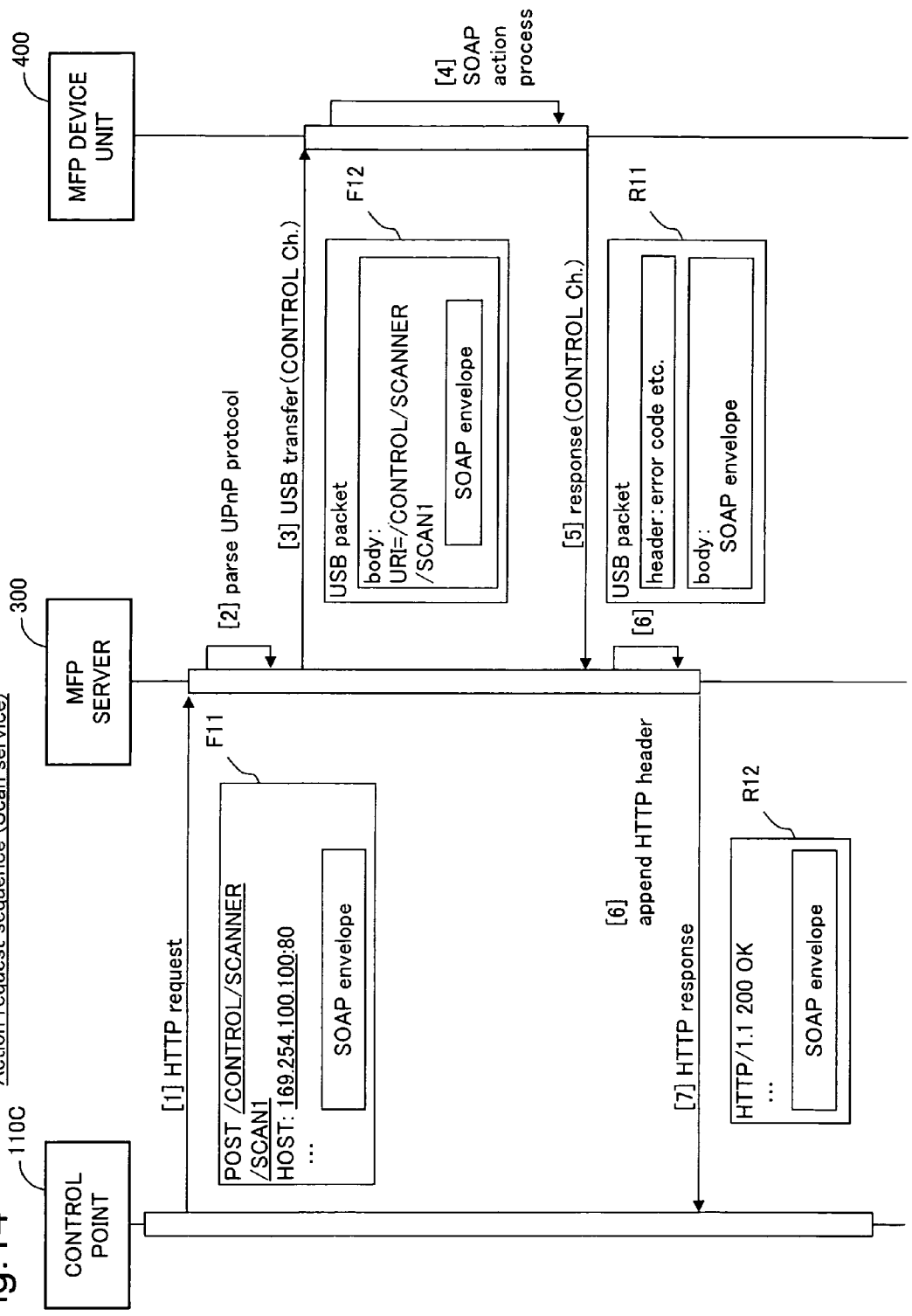
FIG. 14 is a sequence diagram depicting yet another action request procedure.

FIG. 14 is an illustration of yet another action request sequence. In the example of FIG. 14 as well, the destination path name is different from those in the examples of FIG. 12 and FIG. 13. Specifically, in FIG. 14 the path name is "/CONTROL/SCANNER/SCAN1." The highest level path name "/CONTROL" is the same as in FIG. 12 and FIG. 13, so the logical channel selected for use will be the same as in FIG. 12 and FIG. 13. The low-level path name "/SCANNER/SCAN1" differs from those of the examples of FIG. 12 and FIG. 13. Consequently, in Step 4 of FIG. 14, the message body is transferred to the "Scan" service module (FIG. 11) associated with the low-level path name "/SCANNER/SCAN1," where it is processed. The specifics of the other processes in FIG. 14 are the same as in FIGS. 12 and 13.

In this way it can be appreciated that in the examples of FIG. 12 to FIG. 14, a logical channel for USB transfer is selected according to the highest level path name "/CONTROL" of the action request destination, while the service module which is the destination for the message is determined according to low-level path name.

FIG. 15 is a sequence diagram of the procedure in a case where the control point 110C acquires an event initial value from the multifunction peripheral device 200. In Step 1 of FIG. 15, the control point 110C transfers to the MFP server 300 a request message F21 requesting an event initial value. The header of this request message F21 describes the destination path name "/EVENT/PRINTER/PRINTENHANCED1" and the IP address "169.254.100.100" of the multifunction peripheral device 200. This path name is set to the same value as the path name of the event server described in the <eventSubURL> element of the device description shown in FIG. 9.

In Step 2 of FIG. 15, the MFP server 300 parses the highest level path name "/EVENT" of the destination for the request message F21, and selects a logical channel. As explained in FIG. 5B, there is provided the UPNP-EVENT channel which is used in relation to eventing; the UPNP-EVENT channel however is used only for sending a event occurring in the multifunction peripheral device 200 to a control point. There is also the UPNP-LOCALEVENT channel which is used for communication where the MFP device unit 400 is the requestor and the MFP server 300 is the responder, and therefore the UPNP-LOCALEVENT channel is also unsuitable for sending a request for an event initial value from the MFP server 300 to the MFP device unit 400. Accordingly, in the example of FIG. 15, the UPNP-LOCALCONTROL channel is used. This channel is used in cases where in communication between the MFP server 300 and the MFP device unit 400 the MFP server 300 is the requestor and the MFP device unit 400 is the responder. A correspondence relationship between the UPNP-LOCALCONTROL channel and the highest level path name "/EVENT" of the HTTP request destination has been pre-established in the network protocol controller 302 in the MFP server 300. Consequently, in Step 3 of FIG. 15, the MFP server 300, using the UPNP-LOCALCONTROL channel, transfers a message F22 requesting an event initial value to the MFP device unit 400. The body of this message F22 describes the destination path name "/EVENT/PRINTER/PRINTENHANCED1" as-is. In accordance with the low-level path name "/PRINTER/PRINTENHANCED1" the message is sent to the "PrintEnhanced" service module (FIG. 11) of the printer device.

In Step 4 of FIG. 15, the "PrintEnhanced" service module creates XML data describing the event initial values. As shown in FIG. 8, event servers and state tables are provided to services of UPnP devices. A state table is a table for storing state variables that indicate various states of a service. An "event initial value" refers to an initial value in a state table (the initial value of a state variable). In Step 5 of FIG. 15, the MFP device unit 400 transfers to the MFP server 300 a message R21 containing this XML data. Here as well, the same UPNP-LOCALCONTROL channel used in Step 4 is used. In Step 6, the MFP server 300 refers to the error code of the message R21 and appends an HTTP header accordingly. In Step 7, the HTTP response message R22 created in this way is transferred from the MFP server 300 to the control point 110C.

As will be understood from the example of FIG. 15, there are instances in which there is no matching text whatsoever between the highest level path name "/EVENT" of the destination of a message from the control point 110C, and the name of the "UPNP-LOCALCONTROL" channel which is used. However, in such instances the relationship between the highest level path name and the logical channel which is used has been pre-established within the MFP server 300, and the logical channel will be selected in accordance therewith. Consequently, it is possible to easily select a logical channel from the highest level path name only.

FIG. 16 depicts an example of the sequence when an event has occurred. An "event" refers to a change in a value (a state variable) in the state table (FIG. 8). When a value in the state table changes, the event server notifies the control point subscribing to the service that an event has occurred.

When an event occurs, first, in Step 1 in FIG. 16, the MFP device unit 400 creates XML data describing the event which occurred. In Step 2, the MFP device unit 400 transfers by USB an event occurrence message F31 to the MFP server 300. As described with reference to FIG. 5B as well, the UPNP-EVENT channel is used for USB transfer of messages when an event has occurred. In Step 3, the MFP server 300 appends an HTTP header to the message F31 and creates a message F32 to the control points. In Step 4, this message F32 is sent to the control points subscribing to the service in which the event has occurred. A NOTIFY method is used at this time. When the control point 110C receives the message F32, it returns a response message R31 to the MFP server 300 in Step 5.

In this way, during the occurrence of an event as well, the MFP server 300 simply transfers the message, without parsing or interpreting the content of the message. Accordingly, it is possible to employ a simple configuration for the MFP server 300.

FIG. 17 is a sequence diagram of the procedure in a case where service content is sent from a control point to the multifunction peripheral device 200. In Step 1, a request message F41 is sent from the control point 110C to the MFP server 300. This message F41 describes the request command method (POST method), the destination path name "/DOWN/PRINTER/PRINTENHANCED1" and the IP address "169.254.100.100" of the multifunction peripheral device 200. In Step 2, the MFP server 300 parses the header of the message F41, and decides that it is necessary to acquire from the MFP device unit 400 a request ID used for data transfer by the POST process. The request ID is an ID appended to the header of all D4 packets (FIG. 6) during transfer of content data from the MFP server 300 of the MFP device unit 400, and is used to distinguish it from other data. In Step 3, the MFP server 300 transfers a message F42 requesting a request ID to the MFP device unit 400. The body of this message F42 describes the request command method (POST method) and the destination path name "/DOWN/PRINTER/PRINTENHANCED1." The UPNP-LOCALCONTROL channel is used to transfer the message F42.

In Step 4, the MFP device unit 400 creates a request ID in accordance with the request of the message F42, and also creates a channel ID for the purpose of specifying one of the Ndown number of UPNP-DOWNCONTENTx channels. As the value of the channel ID, there can be assigned, for example, the smallest value among the channel IDs of the UPNP-DOWNCONTENTx channels not being used at the time. Creation of the request ID and the channel ID is performed by the device controller 402 (FIG. 1). In Step 5, a message R41 containing the request ID and the channel ID is returned from the MFP device unit 400 to the MFP server 300. During this process as well, the UPNP-LOCALCONTROL channel is used.

After the MFP server 300 has been notified of the request ID and the channel ID in this manner, and once the MFP server 300 has completed reception of the content data in Step 6, in Step 7 the MFP server 300 transfers to the MFP device unit 400 a message F43 that contains content data (e.g. XHTML data). The request ID assigned in Step 5 is noted in the header of each packet of the message F43. The one channel specified by the channel ID among the Ndown number of UPNP-DOWNCONTENTx channels is used as the logical channel. In the example of FIG. 17, since the channel ID value is "1" the first channel UPNP-DOWNCONTENT1 is used. By referring to the request ID of the message F43 the MFP device unit 400 can easily recognize that these packets are packets for the process requested in Step 3. During the content data transmission process, since a single channel among the pre-established Ndown UPNP-DOWNCONTENTx logical channels is assigned for each single content, it is possible for multiple content transmission processes to take place in parallel.

When the content data transmission process is completed, in Step 8, a response message F42 indicating that the process is complete is sent from the MFP device unit 400 to the MFP server 300. In Step 9, the MFP server 300, referring to the error code of the message R42, appends an HTTP header accordingly. In Step 10, the HTTP response message R43 created in this way is transferred from the MFP server 300 to the control point 110C.

In this way, during transmission (downloading) of service content, first, a request ID for identifying D4 packets and a channel ID specifying the logical channel to be used are acquired using the UPNP-LOCALCONTROL channel. Consequently, packets used in the transfer process of given content data can be recognized easily. Also, a useable channel can be selected easily from among the plurality of UPNP-DOWNCONTENTx channels.

FIG. 18 is a sequence diagram of the procedure in a case where a control point acquires a service content from the multifunction peripheral device 200. In Step 1, a request message F51 is transferred from the control point 110C to the MFP server 300. This message F51 describes the request command method (GET method), the destination path name "/UP/PRINTER/PRINTENHANCED1" and the IP address "169.254.100.100" of the multifunction peripheral device 200. In Step 2, the MFP server 300 parses the header of this message F51, and decides that it is necessary to acquire from the MFP device unit 400 a request ID used for data transfer by the GET process. In Step 3, the MFP server 300 transfers a message F52 requesting a request ID to the MFP device unit 400. The body of this message F52 describes the request command method (GET method) and the destination path name "/UP/PRINTER/PRINTENHANCED1." The UPNP-LOCALCONTROL channel is used for transfer at this time.

In Step 4, the MFP device unit 400 creates a request ID in accordance with the request of the message F52, and also creates a channel ID for the purpose of specifying one of the Nup number of UPNP-UPCONTENTx channels. As the value of the channel ID, there can be assigned, for example, the smallest value among the channel IDs of the UPNP-UPCONTENTx channels not being used at the time. In Step 5, a message R51 containing the request ID and the channel ID is returned from the MFP device unit 400 to the MFP server 300. During this process as well, the UPNP-LOCALCONTROL channel is used.

After the MFP server 300 has been notified of the request ID and the channel ID in this manner, and once creation of content data has been completed in Step 6, in Step 7 the MFP device unit 400 transfers to the MFP server 300 a message R52 that contains the content data. The request ID of which the MFP server 300 was notified in Step 5 is noted in the header of each packet of this message R52. The one channel specified by the channel ID among the Nup UPNP-UPCONTENTx channels is used as the logical channel. In the example of FIG. 18, since the channel ID value is "1" the first channel UPNP-UPCONTENT1 is used. By referring to the request ID of the message R52 the MFP device unit 400 can easily recognize that these packets are packets for the process requested in Step 3. During the content data USB transmission process, since a single channel among the pre-established Nup UPNP-UPCONTENTx logical channels is assigned for each single content, it is possible for multiple content transmission processes to take place in parallel.

When the content data USB transmission process is completed, in Step 8, the MFP server 300 appends an HTTP header to the content data to create a message R53. In Step 9, the message R53 created in this way is transferred from the MFP server 300 to the control point 110C.

In this way, during transmission of service content to a control point in response to a request from the control point, first, a request ID for identifying packets for the transmission process, and a channel ID specifying the logical channel to be used, are acquired using the UPNP-LOCALCONTROL channel. Consequently, a plurality of packets used in the transfer process of a single content can be recognized easily. Also, a useable channel can be selected easily from among the plurality of UPNP-UPCONTENTx channels.

G. Data Transfer Sequence to Service Devices Other than Printer Device

FIG. 19 is a sequence diagram of the procedure for transferring a message to the storage device in accordance with UPnP protocol. In Step 1, a request message F61 is sent from the control point 110C to the MFP server 300 in accordance with UPnP protocol. This message F61 describes the request command method (POST method), the destination path name "/DOWN/PRINTER/CDH" and the IP address "169.254.100.100" of the multifunction peripheral device 200.

The first half "/DOWN/PRINTER" of the destination path name "/DOWN/PRINTER/CDH" indicates the use of the UPNP-DOWNCONTENTx channel for use with the printer device. The second half "/CDH" indicates the final destination is the storage device. If the final destination is the scanner device, the second half of the destination path name will indicate the name of the scanner device (e.g. "/SCN"). If the final destination is the printer device, the destination path name will be "/DOWN/PRINTER."

In this way, using UPnP protocol, a control point can send a message destined for service devices other than the printer device of the multifunction peripheral device 200. At this time, in preferred practice the message destination will include a portion indicating the use of a specific logical channel for use with the printer device, and a portion indicating that a service device other than the printer device is the final destination.

In Step 2, the MFP server 300 parses the header of the message F61, and decides that it is necessary to acquire from the MFP device unit 400 a request ID for use in data transfer by the POST process. The request ID is an ID appended to the header of all D4 packets (FIG. 6) during transfer of content data from the MFP server 300 of the MFP device unit 400, and is used to distinguish them from packets of other messages. In Step 3, the MFP server 300 transfers a message F62 requesting a request ID to the MFP device unit 400. The body of this message F62 describes the request command method (POST method) and the destination path name "/DOWN/PRINTER/ CDH." The UPNP-LOCALCONTROL channel is used to transfer the message F62. As explained previously with reference to FIG. 5B, the channels used for transfer of content data are the content channels (the UPNP-DOWNCONTENTx channels and the UPNP-UPCONTENTx channels), but these content channels are used exclusively for transfer of content data per se. Accordingly, in the example of FIG. 19, the UPNP-LOCALCONTROL channel is used to transfer the message F62 requesting acquisition of a request ID. This channel is used between the MFP server 300 and the MFP device unit 400, for communication where the MFP server 300 is the requestor and the MFP device unit 400 is the responder. A correspondence relationship between the UPNP-LOCALCONTROL channel and the highest level path name "/DOWN" of the HTTP request destination has been pre-established in the network protocol controller 302 in the MFP server 300. In Step 3 of FIG. 19, the MFP server 300, referring to this correspondence relationship, decides to use the UPNP-LOCALCONTROL channel, and transfers a message F62 requesting a request ID to the MFP device unit 400.

In Step 4, the MFP device unit 400 creates a request ID in accordance with the request of the message F62, and also creates a channel ID for the purpose of specifying one of the Ndown number of UPNP-DOWNCONTENTx channels. As the value of the channel ID, there can be assigned, for example, the smallest value among the channel IDs of the UPNP-DOWNCONTENTx channels not being used at the time. Creation of the request ID and the channel ID is performed by the device controller 402 (FIG. 1). In Step 5, a message R61 containing the request ID and the channel ID is returned from the MFP device unit 400 to the MFP server 300. During this process as well, the UPNP-LOCALCONTROL channel is used.

After the MFP server 300 has been notified of the request ID and the channel ID in this manner, and once the MFP server 300 has completed reception of the content data in Step 6, in Step 7 the MFP server 300 transfers to the MFP device unit 400 a message F63 that contains content data (e.g. JPEG data). The request ID assigned in Step 5 is noted in the header of each packet of the message F63. The one channel specified by the channel ID among the Ndown UPNP-DOWNCONTENTx channels is used as the logical channel. In the example of FIG. 19, since the channel ID value is "1" the first channel UPNP-DOWNCONTENT1 is used. By referring to the request ID of the message F63, the MFP device unit 400 can easily recognize that these packets are packets for the process requested in Step 3. During the content data transmission process, since a single channel among the pre-established Ndown UPNP-DOWNCONTENTx logical channels is assigned for each single content stream, it is possible for multiple content transmission processes to take place in parallel.

In Step 8, content data transferred to the MFP device unit 400 in this manner is stored in the storage device which is the final destination. When storage of the content data is complete, in Step 9, a response message R62 indicating that the process has been completed is transferred from the MFP device unit 400 to the MFP server 300. In Step 10, the MFP server 300, referring to the error code of the message R62, appends an HTTP header accordingly. In Step 11, the HTTP response message R63 created in this way is transferred from the MFP server 300 to the control point 110C.

In the case of transmission of content data destined for the printer device, on the other hand, the destination name of the message will consist of the path name of the destination name in the message F61 shown in FIG. 19 excluding the last part "/CDH" (i.e. "/DOWN/PRINTER"), or a path name including a part indicating a print service (i.e. "/DOWN/PRINTER/ PRINTENHANCED1"). At this time, in Step 8, the content data will be transferred to the printer device, not the storage device. In other respects, however, the sequence is the same as in FIG. 19.

FIG. 20 is an illustration of the path for transfer of a message to the storage device in accordance with the UPnP protocol. As indicated by the broken lines, a message from a control point is presented to the service control parser 1000 within the MFP server 300, via the TCP/IP layer and the UPnP device architecture 1100. The service control parser 1000 parses the message header and determines its destination. This message is packetized by the D4 packet processor 1300, then transferred by USB to the printer class driver 1310.

Where the destination is the UPnP storage device, the message sent to the MFP device unit 400 is presented to the storage device of the UPnP function module 2400, via the printer class driver 2310 and the D4 packet processor 2300.

During transfer of a message destined for the scanner device in accordance with the UPnP protocol as well, transfer takes place using the printer class in the same way as in FIG. 20. In this way, the printer class can be used during transfer of messages destined for service devices other than the printer device in accordance with the UPnP protocol. The advantages of doing so are as follows. Generally, the mass storage class can be employed as the USB class for a memory card. With the mass storage class, however, only one message at a time can be forwarded from the host, and parallel transfer of several messages is not possible. The same is true for the scanner class. With the printer class, on the other hand, communication using D4 packets is standard, and design of D4 packet structure is to some extent arbitrary. Consequently, with the printer class, parallel transfer of several messages is possible. At this time, multiple messages can be distinguished by means of the request ID described in FIG. 19, for example. With the UPnP protocol, it sometimes occurs that messages destined for a given service device are transferred at the same time from several control points. An inconvenience associated with the USB mass storage class and scanner class is than only a single message at a time can be transferred from a single control point. Accordingly, an advantage of employing the printer class which uses D4 packets in the manner described above is that messages from multiple control points can be transferred in parallel to a given service device.

Figure 21:
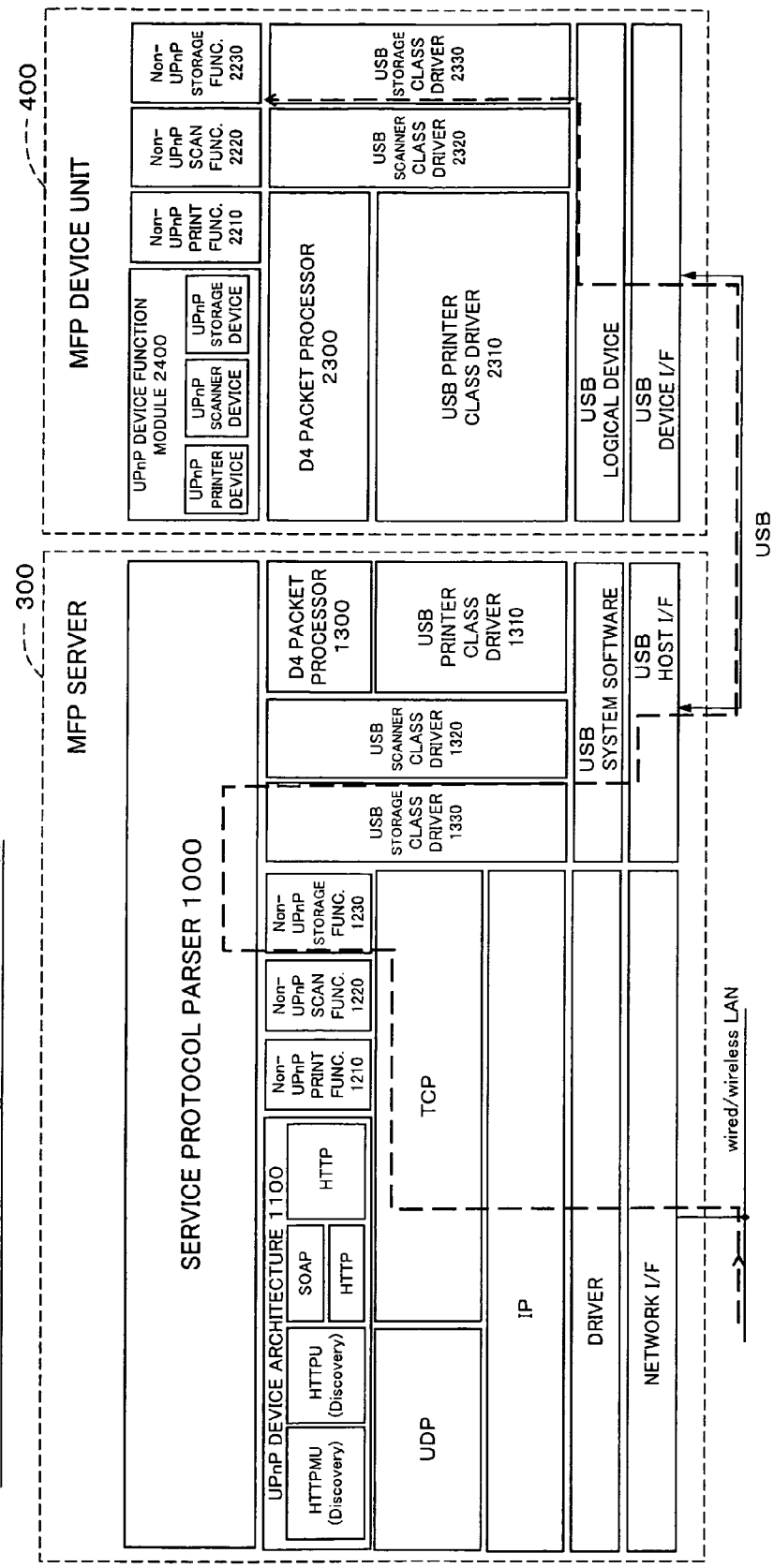
FIG. 21 is an illustration of the path for transfer of a message to the storage device in accordance with a network protocol which is not the UPnP protocol.

FIG. 21 is an illustration of the path for transfer of a message to the storage device in accordance with a network protocol which is not the UPnP protocol. Here, it is assumed that the storage device 408 of the MFP device unit 400 is recognized as a memory device on the LAN, and that this storage device 408 is being accessed by a client on the network (e.g. the personal computer 100 of FIG. 1). At this time, a message from a client will be presented to the service protocol parser 1000 via the TCP/IP layer and the non-PnP storage function module 1230. The service protocol parser 1000 parses the message header and determines its transfer destination. This message is transferred by USB to the storage class driver 1330. The message body of the message sent to the MFP device unit 400 is presented to the non-UPnP storage function module 2230 via the storage class driver 2330.

In this way, a message transferred to a device destination other than the printer device in accordance with a network protocol other than UPnP protocol will be transferred using the device class for use with respective device, rather than the printer class. Consequently, message transfer to the storage device according to UPnP protocol (FIG. 20) can be carried out parallel with message transfer to the storage device according to a network protocol other than UPnP protocol (FIG. 21), for example.

H. Other Embodiments

Figure 22:
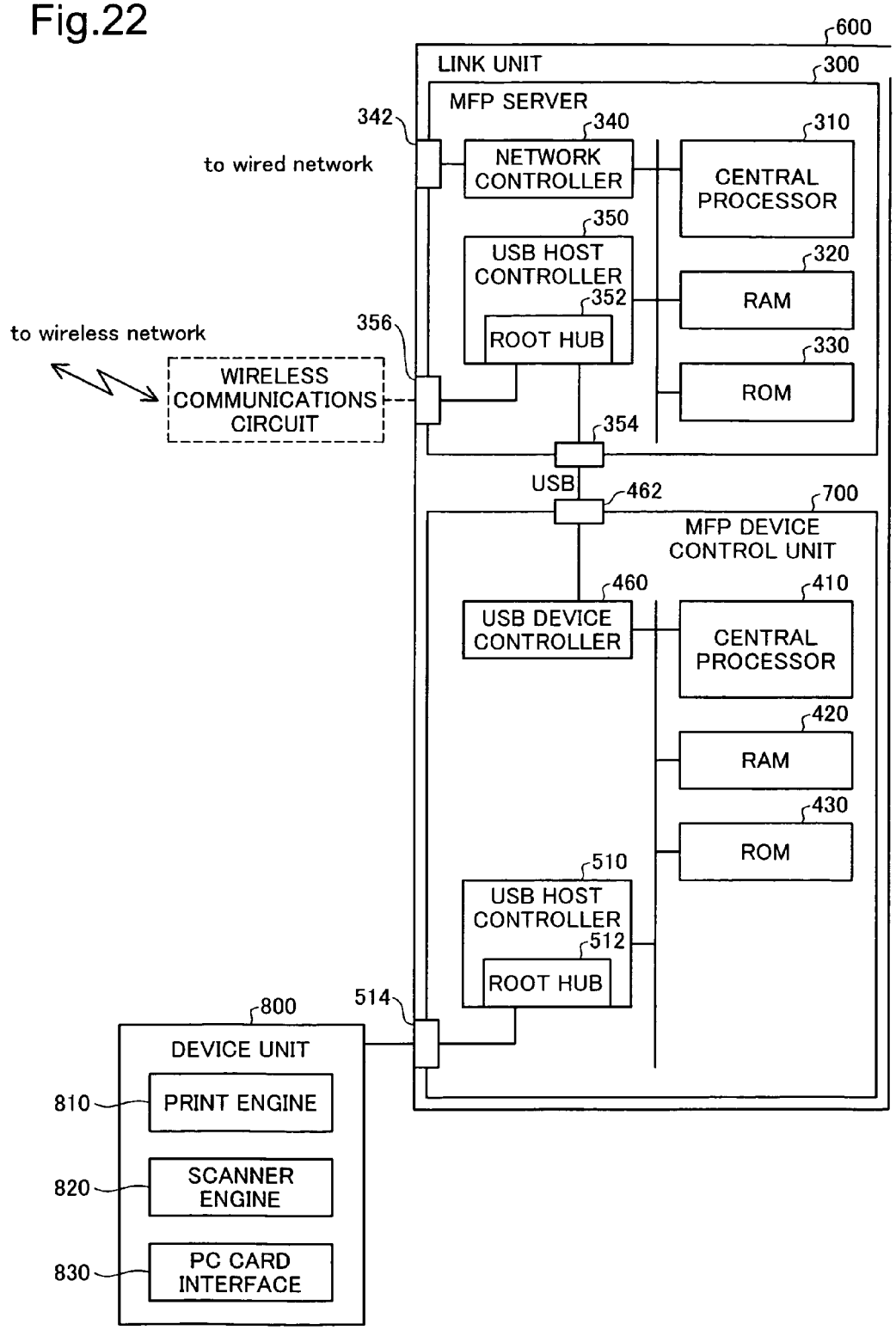
FIG. 22 is a block diagram showing the internal configuration of a multifunction system in Embodiment 2.

FIG. 22 is a block diagram showing the configuration of a multifunction peripheral device system in Embodiment 2 of the present invention. This system has a configuration in which a link unit 600 and a device unit 800 are connected by USB. The link unit 600 has an MFP server 300 and an MFP device control unit 700. The MFP server 300 is the same as that depicted in FIG. 2. The MFP device control unit 700 lacks certain components of the MFP device unit 400 illustrated in FIG. 2, namely, the USB device controller 470, the PC card interface 480, the control panel controller 490, the control panel 492, the viewer controller 500, the viewer 502, the print engine 440, and the scanner engine 450. The device unit 800 is connected to the root hub 512 of the USB host controller 510.

The device unit 800 has a print engine 810, a scanner engine 820, and a PC card interface 830. While omitted from the drawing, in preferred practice the device unit 800 will also be furnished with a control panel and a viewer. The multifunction system can be understood as separating the three devices (printer, scanner, and storage) from the multifunction peripheral device 200 of FIG. 2, so that these constitute an independent device unit 800.

Figure 23:
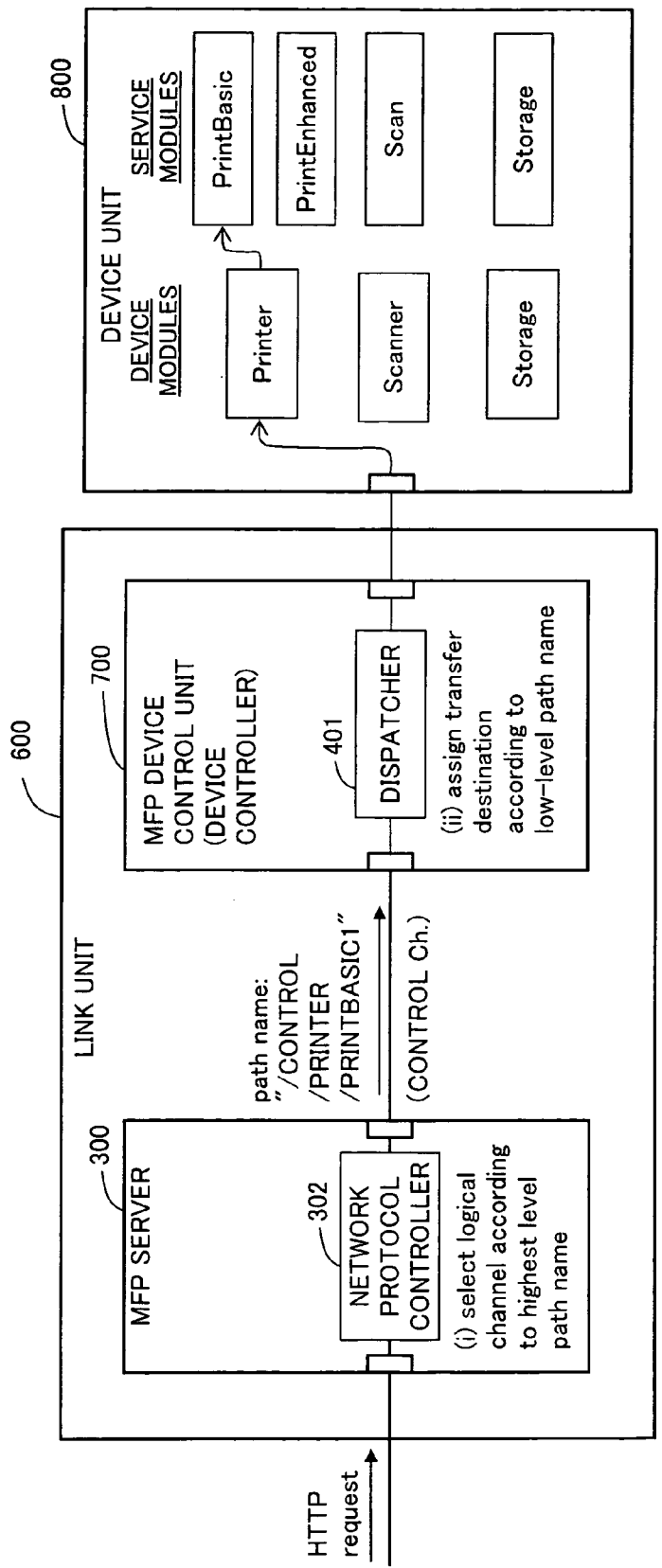
FIG. 23 illustrates the flow of data transfer in Embodiment 2.

FIG. 23 is an illustration showing the flow of data transfer when a request (HTTP request) is received from a control point. The MFP server 300 (FIG. 22) has the functions of the network protocol controller 302, while the MFP device control unit 700 has the functions of the dispatcher 401. Here, the functions of the network protocol controller 302 and the dispatcher 401 are identical to these functions shown in FIG. 11. Specifically, the network protocol controller 302 selects a logical channel according to the highest level path name, and transfers messages to the MFP device control unit 700. The dispatcher 401 of the MFP device control unit 700 switches the device module and service module of the message transfer destination according to the low-level path name. The software portions of device modules and service modules may be furnished within the MFP device control unit 700.

In Embodiment 2, since the MFP device control unit 700 and the device unit 800 have a USB connection, in preferred practice logical channels identical to those shown in FIG. 4 will be provided between them. By so doing, a logical channel for use in transfer between the two units 700, 800 can be selected easily, affording greater ease of control of the MFP device control unit 700.

In Embodiment 2 as well, the network protocol controller 302 selects a logical channel according to the highest level path name of the destination for the request, so that an appropriate logical channel can be selected easily from among a plurality of logical channels. Since the MFP device control unit 700 switches the data transfer service destination according to the low-level path name, the request can be easily delivered to the appropriate service device.

I. Variation Examples

The invention is not limited to the embodiments discussed above, and may be reduced to practice in various other forms without departing from the spirit thereof; the following variations are possible, for example.

I1. Variation Example 1

In the embodiments discussed previously, a multifunction peripheral device 200 that includes multiple devices was used as the UPnP compliant network device; however, it would be possible to employ a single-function network device that includes only a single device (e.g. a printer). In other words, it is acceptable as long as a network device has at least one device.

I2. Variation Example 2

While the preceding embodiments, especially concerning the opening of the content channels, described a network device comprising a USB host and a USB device, the present invention is not limited to network devices, and is applicable to any device comprising a USB host and a USB device.

I3. Variation Example 3

It is possible to use any type of device besides the printer as a device using packetized logical channels. For example, it would be possible to employ packetized logical channels for scanner use. In this case, the packetized logical channels for scanner use can be use during transfer of messages to devices of other classes.

The physical connection between the network controller 302 and the device controller 402 (FIG. 1) is not limited to a USB connection, it being possible to use any kind of connection. For example, the controllers 302, 304 may be connected by a bus. However, the use of a USB connection has the advantage that packetized logical channels can be configured easily.

I4. Variation Example 4

Some of the arrangements realized through hardware in the preceding embodiments could instead be replaced by software, and conversely some of the arrangements realized through software could be replaced by hardware.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A network device compliant with a network plug-and-play protocol, comprising:
    a plurality of service devices for executing a service in response to a request from a client on the network;
    a device controller for controlling the plurality of service devices; and
    a network protocol controller for receiving from a client on the network a message containing a message header and a message body, and for transferring content of the message body to the device controller,
    wherein the plurality of service devices include a first device, and a second device of different type from the first device,
    the network protocol controller and the device controller are connected by a packetized logical channel for use by the first device, and
    the network protocol controller, upon having received a message destined for the second device according to the network plug-and-play protocol, transfers the content of the message body of the received message to the device controller, using the packetized logical channel for use by the first; wherein
    the connection between the network protocol controller and the device controller has a non-packetized logical channel for use by the second device, in addition to the packetized logical channel for use by the first device, and
    the network protocol controller, upon having received a message destined for the second device according to a network protocol other than the network plug-and-play protocol, transfers the content of the message body of the received message to the device controller, using the non-packetized logical channel for use by the second device.

2. The network device according to claim 1, wherein a path name of the destination of the message destined for the second device includes a first part indicating use of the packetized logical channel for use by the first device, and a second part indicating that the final destination is the second device.

3. The network device according to claim 1, wherein
    the network protocol controller and the device controller are connected by USB, and
    the first device is a printer device.

4. The network device according to claim 1, wherein
    the network protocol controller and the device controller are connected by a plurality of logical channels including the packetized logical channel for use by the first device, and
    the network protocol controller selects one of the plurality of logical channels with reference to a highest-order path name which is a highest-order part of an entire path name representing the destination of the message received from the client, and transfers the content of the message to the device controller using the selected logical channel.

5. The network device according to claim 4, wherein
    the network protocol controller transfers the path names of the message in addition to the content of the message body to the device controller; and
    the device controller, with reference to a low-order path name which is a lower order part than the highest-order part within the entire path name of the message, selects one of the plurality of service devices, and supplies the content of the message body to the selected service device.

6. The network device according to claim 5, wherein
    at least one specific service device among the plurality of service devices has a plurality of service modules for executing a plurality of services, and
    if the low-order path name includes a device name indicating the specific service device and a service name indicating one of the plurality of service modules, the device controller selects one of the plurality of service modules with reference to the service name, and provides the content of the message body to the selected service module.

7. The network device according to claim 4, wherein the plurality of logical channels are USB logical channels using D4 packets.

8. The network device according to claim 1, wherein
    the device controller functions as a USB device while the network protocol controller functions as a USB host,
    the network protocol controller sends to the device controller query for a channel number of specific-purpose logical channels,
    the device controller, in response to the query, returns to the network protocol controller a channel number of the specific-purpose logical channels, and
    the network protocol controller opens only the channel number of the specific-purpose logical channels notified by the response.

9. The network device according to claim 8, wherein the specific-purpose logical channels are logical channels for sending or receiving content data.

10. The network device according to claim 8, wherein
    the query for the channel number of specific-purpose logical channels from the network protocol controller to the device controller is performed at startup of the network device.

11. The network device according to claim 8, wherein
    the specific-purpose logical channels are USB logical channels using D4 packets.

12. A method of controlling a network device compliant with a network plug-and-play protocol, the network device comprising a plurality of service devices for executing a service in response to a request from a client on the network; a device controller for controlling the plurality of service devices; and a network protocol controller for transferring to the device controller a message received from a client on the network, wherein
    the plurality of service devices include a first device, and a second device of different type from the first device; and
    the network protocol controller and the device controller are connected by a packetized logical channel for use by the first device; and
    the connection between the network protocol controller and the device controller has a non-packetized logical channel for use by the second device, in addition to the packetized logical channel for use by the first device, and
    the method comprising the steps of:
    (a) receiving from a client on the network a message containing a message header and a message body; and
    (b) transferring content of the message body of the received message to the device controller,
    wherein the step (b) comprises the step of the network protocol controller, upon having received a message destined for the second device according to the network plug-and-play protocol, transfers the content of the message body of the received message to the device controller, using the packetized logical channel for use by the first device; and wherein the network protocol controller, upon having received a message destined for the second device according to a network protocol other than the network plug-and-play protocol, transfers the content of the message body of the received message to the device controller, using the non-packetized logical channel for use by the second device.

13. A device comprising a USB host and a USB device, wherein
    the USB host sends to the USB device query for a channel number of specific-purpose logical channels,
    the USB device, in response to the query, returns to the USB host a channel number of the specific-purpose logical channels, and
    the USB host opens only the channel number of the specific-purpose logical channels notified by the response.

14. The device according to claim 13, wherein
    the device is a network device compliant with a network plug-and-play protocol and comprising one or more service devices for executing a service in response to a request from a client on the network,
    the USB device comprises a device controller for controlling the service devices; and
    the USB host includes a network protocol controller for receiving a message having a message header and a message body from a client on the network and forwarding content of the message body to the device controller.

15. The device according to claim 14, wherein the specific-purpose logical channels are logical channels for sending or receiving content data.

16. The device according to claim 13, wherein the query for the channel number of specific-purpose logical channels from the USB host to the USB device is performed at startup of the device.

17. The device according to claim 13, wherein the specific-purpose logical channels are USB logical channels using D4 packets.

* * * * *

UNITED STATES PATENT AND TRADEMARK OFFICE
CERTIFICATE OF CORRECTION

PATENT NO. : 7,664,135 B2 Page 1 of 1
APPLICATION NO. : 11/517439
DATED : February 16, 2010
INVENTOR(S) : Oshima et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 624 days.

Signed and Sealed this

Thirtieth Day of November, 2010

David J. Kappos
*Director of the United States Patent and Trademark Office*